United States Patent
Kawamura et al.

(10) Patent No.: US 8,511,746 B2
(45) Date of Patent: Aug. 20, 2013

(54) FRAME FOR VEHICLE

(75) Inventors: Chikara Kawamura, Hiroshima (JP); Masanori Honda, Hiroshima (JP); Shin Sasaki, Hiroshima (JP); Mitsugi Fukahori, Hiroshima (JP); Naoko Saito, Hiroshima (JP)

(73) Assignee: Mazda Motor Corporation (JP)

( * ) Notice: Subject to any disclaimer, the term of this patent is extended or adjusted under 35 U.S.C. 154(b) by 18 days.

(21) Appl. No.: 13/275,116

(22) Filed: Oct. 17, 2011

(65) Prior Publication Data

US 2012/0098299 A1  Apr. 26, 2012

(30) Foreign Application Priority Data

Oct. 20, 2010  (JP) ................................ 2010-235545

(51) Int. Cl.
*B62D 25/00* (2006.01)

(52) U.S. Cl.
USPC ................. 296/205; 296/187.12; 296/203.03; 296/193.05

(58) Field of Classification Search
USPC ............ 296/209, 203.03, 30, 187.08, 187.12, 296/193.05, 193.06, 205, 187.09, 193.09, 296/203.02; 280/797, 798; 52/839, 842, 52/843; 293/133
See application file for complete search history.

(56) References Cited

U.S. PATENT DOCUMENTS

| | | | | |
|---|---|---|---|---|
| 4,144,369 A | * | 3/1979 | Wass | 428/183 |
| 5,171,058 A | * | 12/1992 | Ishikawa | 296/187.12 |
| 5,496,067 A | * | 3/1996 | Stoll et al. | 280/784 |
| 5,570,558 A | * | 11/1996 | Persson | 296/146.6 |
| 6,705,668 B1 | * | 3/2004 | Makita et al. | 296/187.03 |

FOREIGN PATENT DOCUMENTS

| | | |
|---|---|---|
| JP | 2009-274658 A | 11/2009 |
| JP | 2010-137839 A | 6/2010 |

* cited by examiner

*Primary Examiner* — Jason S Morrow
*Assistant Examiner* — E Turner Hicks
(74) *Attorney, Agent, or Firm* — Studebaker & Brackett PC

(57) ABSTRACT

A frame for a vehicle which is formed to have a closed cross section and constitutes part of a vehicle body, comprising a first face portion on which a compressive force acts when a load acts from an outside, a second face portion on which a tensional force acts when the load acts from the outside, a pair of third face portions which are located between the first face portion and the second face portion and form ridgelines together with the first face portion, and a lateral reinforcement potion which is provided at least one of the third face portions and extending in a line shape from the first face portion toward the second face portion. Accordingly, the frame for a vehicle which can increase the bending strength of the frame is provided.

11 Claims, 16 Drawing Sheets

FRAME FOR VEHICLE

BACKGROUND OF THE INVENTION

The present invention relates to a frame for a vehicle which constitutes part of a vehicle body of the vehicle, such as automotive vehicles, and specifically relates to a frame for a vehicle which is formed to have a closed cross section.

A frame for a vehicle (a vehicle-body frame), such as a side sill or a pillar which constitute part of a vehicle body of the vehicle, such as automotive vehicles, is generally formed to have a closed cross section as well known. It is also known that a bead projecting toward the inside of the frame is formed at a vehicle-body frame to reinforce the vehicle-body frame.

Japanese Patent Laid-Open Publication No. 2010-137839, for example, discloses a side sill which is formed to have a closed cross section by an outer panel and an inner panel, in which a bead extending in a longitudinal direction and projecting toward the inside of the side sill is formed at the outer panel. Further, Japanese Patent Laid-Open Publication No. 2009-274658, for example, discloses another side sill formed to have the closed cross section by an outer panel and an inner panel, in which hollow protruding portions extending in a longitudinal direction and protruding toward the inside of the side sill are formed at the outer panel and the inner panel.

Herein, it has been desired that the bending strength of the vehicle-body frame, such as the side sill or the pillar, is increased so that the frame may not improperly deform toward the inside of the frame even when a load acts on the vehicle from the outside, aiming at improving the safety of passengers properly in a vehicle side collision or the like.

When the load acts on the frame formed to have the closed cross section to bend the frame, as specifically described later, a third face portion which is located between a first face portion on which a compressive force acts and a second face portion on which a tensional force acts and forms a ridgeline together with the first face portion may protrude toward the outside of the frame and have buckling, so that a bending deformation of the frame may be promoted improperly.

Herein, in a case in which the bead is formed to have a closed cross section at the frame and extend in the longitudinal direction of the frame as disclosed in the above-described patent publications, while the bending rigidity of the frame may be improved, the above-described bead may not function very well in restraining the above-described bucking of the third face portion when the load acts on the first face of the frame from the outside. Accordingly, the bead may not be necessarily sufficient as means for restraining the bending deformation of the frame, so that further improvements of the bending strength of the frame should be desired.

SUMMARY OF THE INVENTION

The present invention has been devised in view of the above-described matters, and an object of the present invention is to provide a frame for a vehicle which can restrain the buckling of third face portion of the frame and thereby properly increase the bending strength of the frame.

According to the present invention, there is provided a frame for a vehicle which is formed to have a closed cross section and constitutes part of a vehicle body, comprising a first face portion on which a compressive force acts when a load acts from an outside, a second face portion on which a tensional force acts when the load acts from the outside, a pair of third face portions located between the first face portion and the second face portion and forming a ridgeline together with the first face portion, and a lateral reinforcement potion provided at least at one of the third face portions and extending in a line shape from the first face portion toward the second face portion.

According to the frame for a vehicle of the present invention, the third face portion forming the ridgeline together with the first face portion can be reinforced by the lateral reinforcement portion, so that the buckling of the third face portion can be properly restrained when the load acts from the outside. Accordingly, the bending strength of the frame can be increased. Since the buckling of the third face portion can be restrained when the load acts from the outside, the load can be transmitted to the second face portion via the third face portion. Accordingly, the bending strength of the frame can be effectively increased.

According to an embodiment of the present invention, the lateral reinforcement portion comprises at least two of a first lateral reinforcement portion extending in a sectional direction perpendicular to a longitudinal direction of the frame, a second lateral reinforcement portion extending in a first slant direction relative to the longitudinal direction of the frame, and a third lateral reinforcement portion extending in a second slant direction relative to the longitudinal direction of the frame, the first slant direction and the second slant direction being set to be opposite to each other with respect to the sectional direction. Thereby, the bending strength of the frame against the load acting on the first face portion of the frame from the outside can be properly increased, compared with a case in which a reinforcement portion extending in the longitudinal direction of the frame is formed in the line shape.

According to another embodiment of the present invention, a longitudinal reinforcement portion extending in the longitudinal direction of the frame in a line shape is provided at a specified position of the third face portion which is located near the ridgeline. Thereby, when it acts from the outside, the load can be transmitted and dispersed along the longitudinal direction of the frame in the vicinity of the ridgeline. Accordingly, the above-described effects can be provided more effectively.

According to another embodiment of the present invention, the lateral reinforcement portion comprises the first lateral reinforcement portion, the second lateral reinforcement portion, the first lateral reinforcement portion, the third lateral reinforcement portion, and the first lateral reinforcement portion which are located in order along the longitudinal direction of the frame. Thereby, the above-described effects can be provided concretely with a relatively simple structure.

According to another embodiment of the present invention, the lateral reinforcement portion comprises plural lateral reinforcement portions, which do not cross each other at a central position, in a sectional direction of the frame, of the third face portion. Thereby, the bending strength of the frame can be increased more properly, compared with a case in which plural lateral reinforcement portions cross each other at the central position, in the sectional direction of the frame, of the third face portion.

According to another embodiment of the present invention, the lateral reinforcement portion comprises at least two lateral reinforcement portions which are adjacent to each other in a longitudinal direction, which are joined together at an one end portion, in a sectional direction of the frame, of the third face portion and form a triangular area together with the other end portion of the third face portion. Thereby, the buckling resistance of the third face portion of the frame can be increased effectively with a relatively simple structure, so that the above-described effects can be provided more effectively.

According to another embodiment of the present invention, the lateral reinforcement portion is configured such that a width thereof becomes wider toward the second face portion from the first face portion. Thereby, the buckling of the lateral reinforcement portion can be effectively restrained when the load acts from the outside.

According to another embodiment of the present invention, the lateral reinforcement portion or the longitudinal reinforcement portion is comprised of a bead. Thereby, the above-described effects can be provided more concretely with a relatively simple structure.

According to another embodiment of the present invention, the lateral reinforcement portion comprises plural portions, and the third face portion is configured such that a central part of an area which is enclosed by two adjacent portions, in a longitudinal direction, of the lateral reinforcement portion and both end portion, in a cross direction of the frame, of the third face portion protrudes in a bead projection direction more than an end part of the area. Thereby, the bead formed in a convex shape can be restrained from opening, so that the above-described effects can be provided more effectively.

According to another embodiment of the present invention, the lateral reinforcement portion is configured such that a bead projection amount becomes greater along a direction from the first face portion to the second face portion. Thereby, in a case in which the first face portion and the third face portion of the frame are formed integrally through a press forming of a plate member, the effect of reinforcing the third face portion can be increased effectively, maintaining a proper press forming by making the amount of deformation at a central portion of the plate member smaller than that of deformation at an end portion of the plate member.

According to another embodiment of the present invention, the lateral reinforcement portion is configured in a curve shape to project toward an outside of the frame from an end side, in the cross direction of the frame, of the third face portion toward a central side, in the cross direction of the frame, of the third face portion. Thereby, the buckling of the bead can be restrained more effectively, so that the above-described effects can be provided more effectively.

According to another embodiment of the present invention, a plate member is attached to an inside of the frame at the bead, and a closed cross section is formed by the plate member and the bead. Thereby, the reinforcement effect of the lateral reinforcement portion can be further increased at the third face portion of the frame, so that the bending strength of the frame can be further improved.

According to another embodiment of the present invention, the frame is a side sill which is formed to have the closed cross section and comprises a side sill outer which comprises an upper face portion extending horizontally, a lower face portion located below the upper face portion and extending horizontally, and a side face portion extending vertically from the lower face portion to the upper face portion and forming ridgelines together with the upper face portion and the lower face portion, and a side sill inner which is provided on an inside of the side face portion of the side sill outer and comprises a side face portion extending vertically, and the lateral reinforcement portion extending in the line shape from the side face portion of the side sill outer toward the side face portion of the side sill inner is provided at the lower face portion of the side sill outer. Thereby, the lower face portion of the side sill outer can be reinforced by the lateral reinforcement portion. Accordingly, the buckling of the lower face portion can be restrained when the load acts on the side face portion of the side sill outer from the outside, so that the bending strength of the side sill can be increased. Further, since the buckling of the lower face portion of the side sill outer can be restrained when the load acts on the side face portion of the side sill outer from the outside, the load can be transmitted to the side face portion of the side sill inner via the lower face portion of the side sill outer, so that the bending strength of the side sill can be increased effectively.

Other features, aspects, and advantages of the present invention will become apparent from the following description which refers to the accompanying drawings.

DETAILED DESCRIPTION OF THE INVENTION

Figure 1:
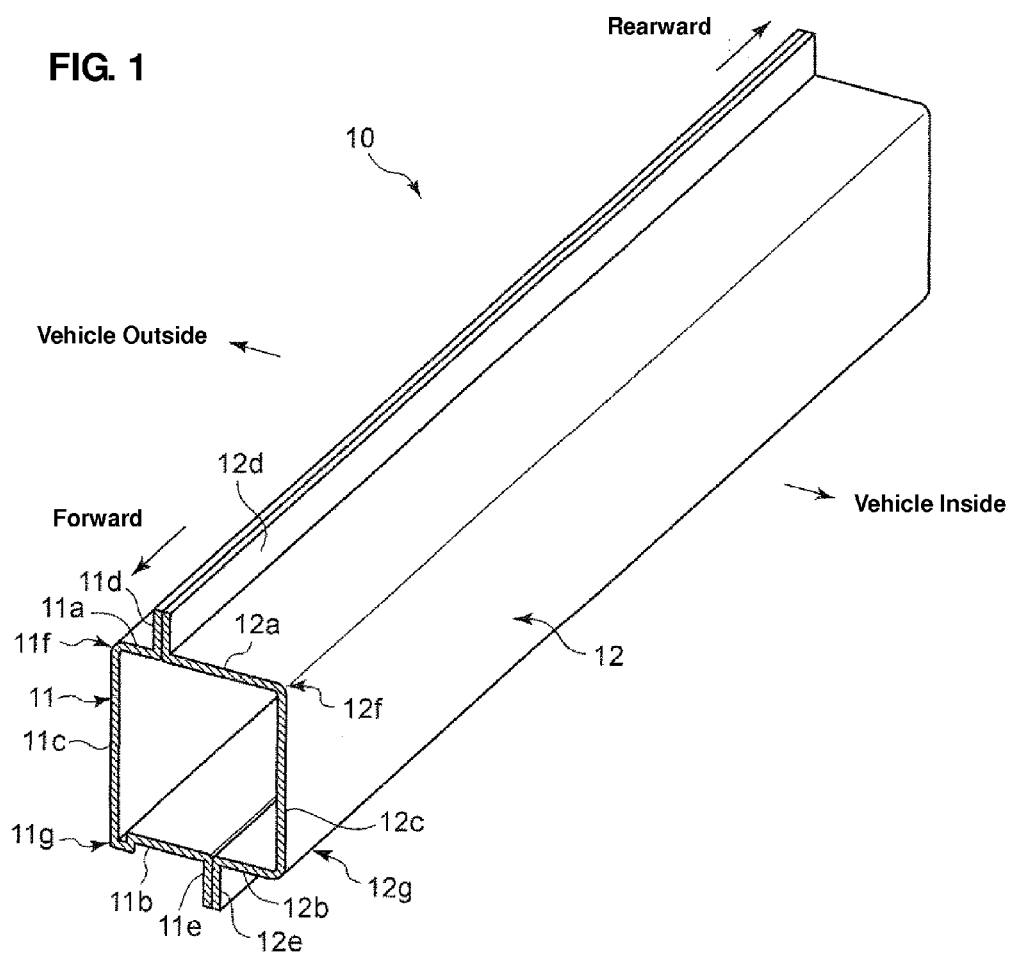
FIG. 1 is a perspective view showing a side sill of a frame for a vehicle according to a first embodiment of the present invention.

Hereinafter, preferred embodiments of the present invention will be described referring to the accompanying drawings. While some specific terms of "upper," "lower," "right," or "left" and other terms containing these specific terms, or some words directed to a specific direction, such as "clockwise" and "counterclockwise" will be used, the purpose of usage of these terms or words is merely to facilitate understanding of the present invention referring to the drawings. Accordingly, it should be noted that the meanings of these terms or words should not improperly limit the technical scope of the present invention.

The inventors of the present application and the like conducted a CAE simulation analysis of a bending deformation development of a side sill, as a frame formed to have a closed cross section, when a bending load acts on the side sill in developing the frame for a vehicle which can increase the bending strength of the frame.

FIGS. 17A-17D are side views of the side sill showing results of the simulation analysis of the bending deformation development of the side sill. In these figures, stresses generating at the side sill, concretely stresses generating at a lower face portion of a side sill outer and a lower face portion of a side sill inner, are shown. FIGS. 18A-18D are sectional views of the side sill showing results of simulation analysis of the bending deformation development of the side sill, which show a cross section of a central portion, in a longitudinal direction, of the side sill, respectively. Herein, the progress of the bending deformation of the side sill is shown in order of FIGS. 17A, 17B, 17C and 17D or FIGS. 18A, 18B, 18C and 18D.

A side sill outer 211 and a side sill inner 212 are used as a model of a side sill 210 in this analysis. Specifically, the side sill outer 211 comprises an upper face portion 211a extending substantially horizontally, a lower face portion 211b extending substantially horizontally, a side face portion 211c extending substantially vertically from the lower face portion 211b to the upper face portion 211a, an upper flange portion 211d extending upwardly from the upper face portion 211a, and a lower flange portion 211e extending downwardly from the lower face portion 211b, which is formed to have a substantially U-shaped cross section.

The side sill inner 212 comprises an upper face portion 212a extending substantially horizontally, a lower face portion 212b extending substantially horizontally, a side face portion 212c extending substantially vertically from the lower face portion 212b to the upper face portion 212a, an upper flange portion 212d extending upwardly from the upper face portion 212a, and a lower flange portion 212e extending downwardly from the lower face portion 212b, which is formed to have a substantially U-shaped cross section.

The side sill outer 211 and the side sill inner 212 are joined together in such a manner that the upper flange portion 211d is joined to the upper flange portion 212d and the lower flange portion 211e is joined to the lower flange portion 212e, thereby forming the side sill 210 in a substantially-rectangular closed-section shape.

In the present embodiment, as shown in FIGS. 17A-17D and 18A-18D, a specified case in which the side sill 210 is supported at the vicinity of its both end portions with the side face portion 211c facing upwardly and a load is applied to act on a central portion, in the longitudinal direction, of the side sill 210 from the outside (from above in the figures) via a pressing member 220 was analyzed.

Figure 17A:
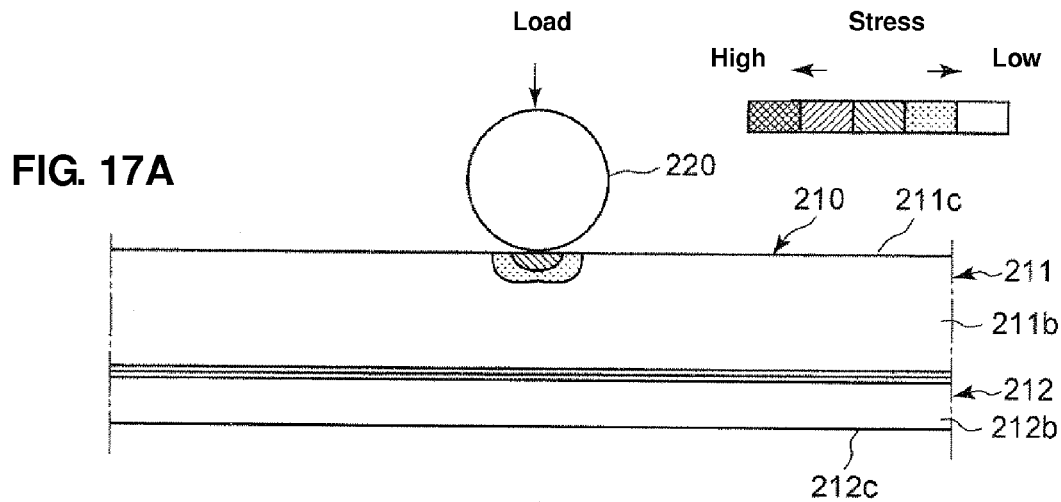
FIGS. 17A-17D are side views of the side sill showing results of simulation analysis of a bending deformation development of the side sill.
Figure 17B:
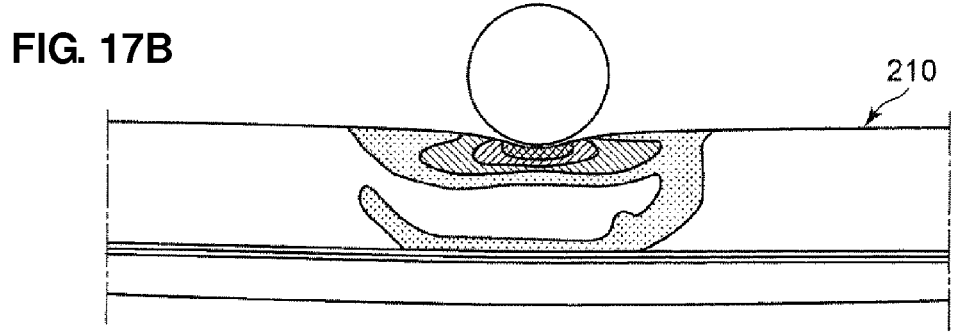
Figure 17C:
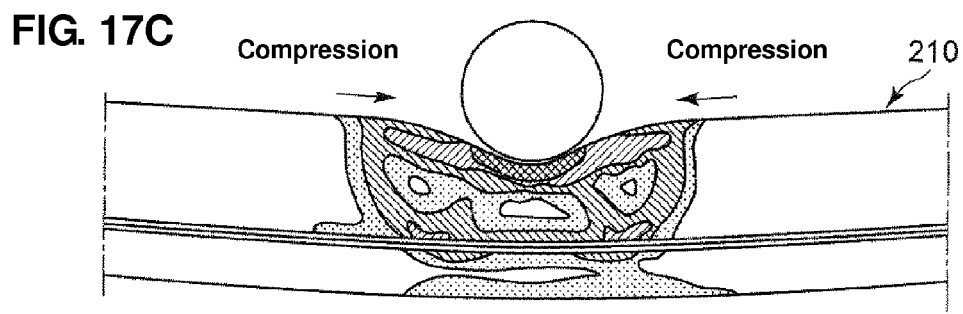
Figure 17D:
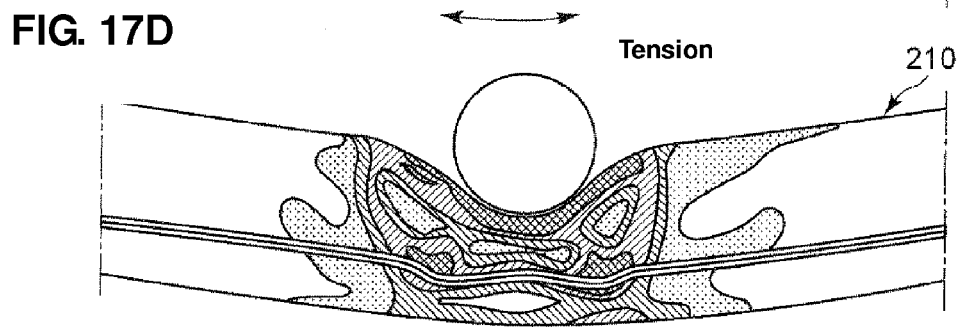

When the bending load acts on the side sill 210 from the outside, as shown in FIG. 17C, a specified portion of the side sill 210 to which the load is applied deforms downwardly in a convex shape, a compressive force acts on the side face portion 211c of the side sill outer 211 from the both side ends of the side sill 210 and a compressive stress generates at this side face portion 211c, and a tensional force acts on the side face portion 212c of the side sill inner 212 from the both side ends of the side sill 210 and a tensional stress generates at this side face portion 212c.

Figure 18A:
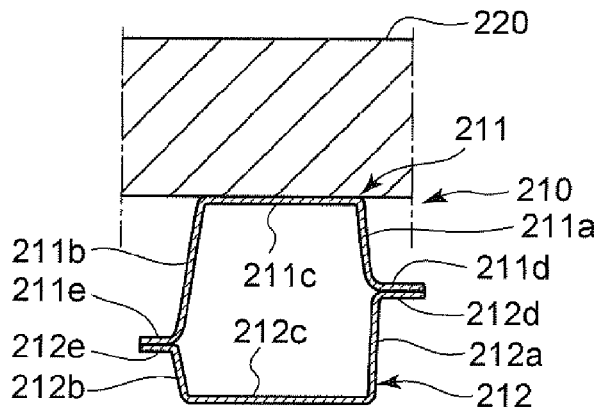
FIGS. 18A-18D are sectional views of the side sill showing results of simulation analysis of the bending deformation development of the side sill.
Figure 18B:
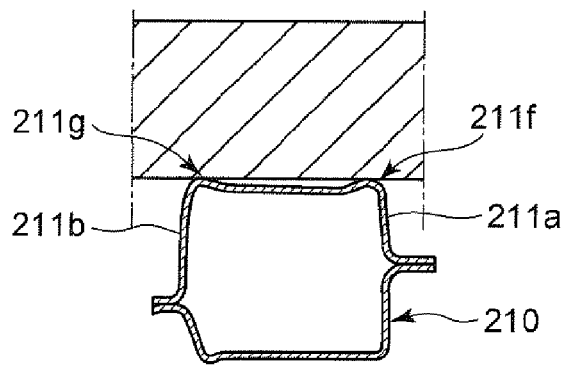
Figure 18C:
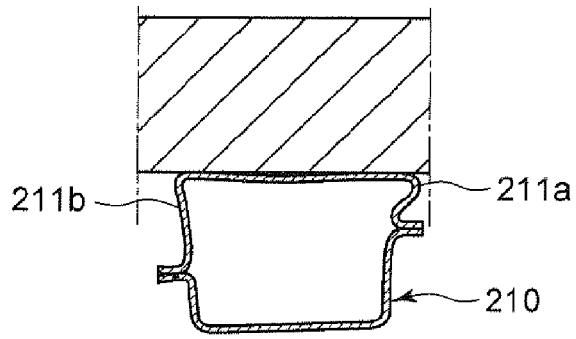
Figure 18D:
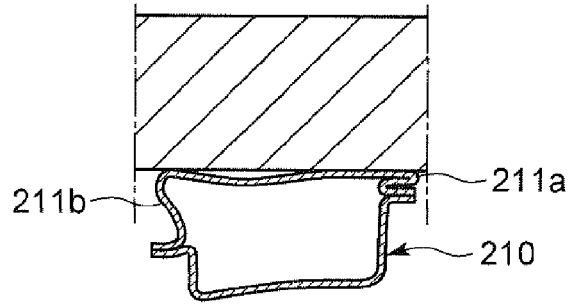

As shown in FIGS. 17A and 18A, once the pressing member 220 lowers and contacts the side sill 210, stresses start generating at the upper face portion 211a and the lower face portion 211b of the side sill outer 211. As shown in FIGS. 17B-17D and 18B-18D, as a lowering stroke of the pressing member 220 increases, the upper face portion 211a and the lower face portion 211b of the side sill outer 211 which form a pair of ridgelines 211f, 211g together with the side face portion 211c of the side sill outer 211 protrude outwardly to have buckling deformation. Thus, the bending deformation of the side sill 210 occurs.

It may be considered from the results of this simulation analysis that the outward buckling of the both-side third face portions (the upper face portion and the lower face portion of the side sill outer) 211a, 211b, which are located between the first face portion (the side face portion of the side sill outer) 211c on which the compressive force acts and the second face portion (the side face portion of the side sill inner) 212c on which the tensional force acts and form the ridgelines 211f, 211g together with the first face portion 211c, caused promotion of the bending deformation of the frame 210 when the frame (the side sill) 210 formed to have the closed cross section bends through receiving an input of the load.

Thus, it can be considered that restraining the buckling of the third face portion which is located between the first face portion on which the compressive force acts and the second face portion on which the tensional force acts when the load acts on the frame from the outside and forms the ridgeline together with the first face portion increases the bending strength of the frame.

Figure 2:
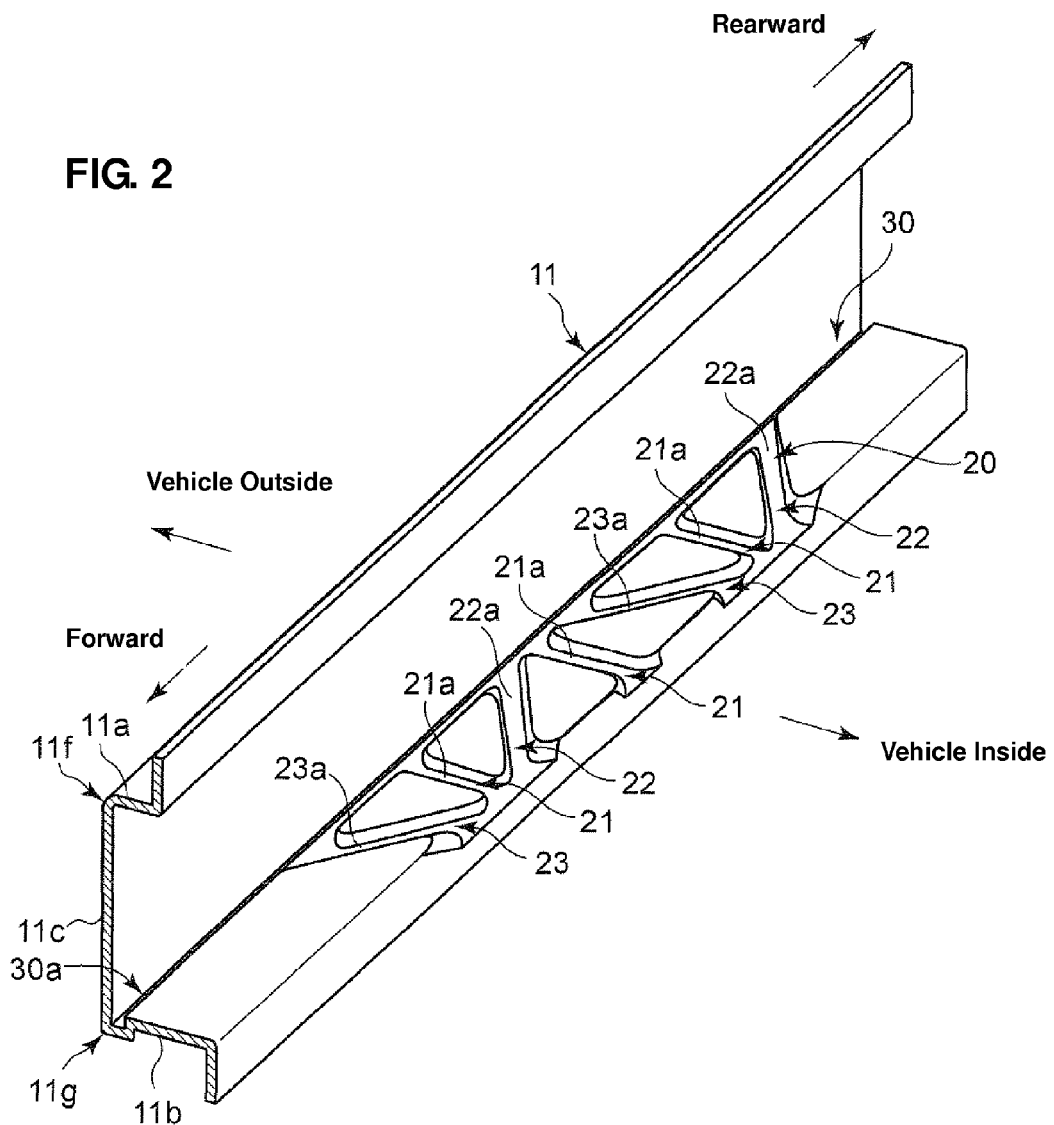
FIG. 2 is a perspective view showing a side sill outer of the side sill.
Figure 3:
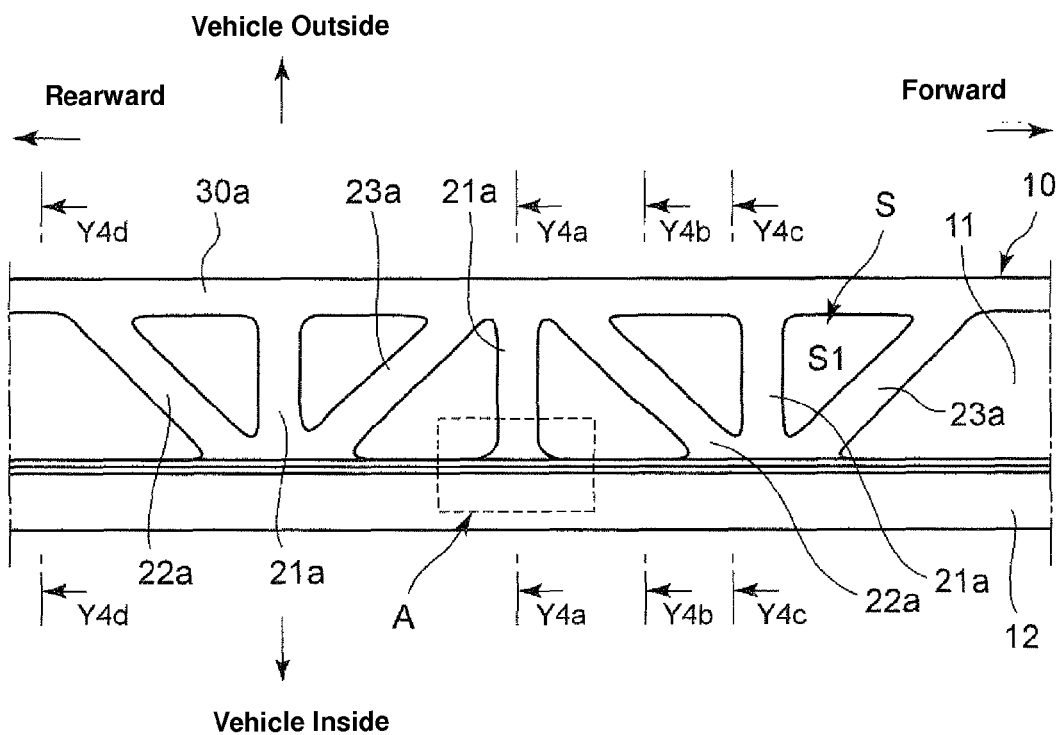
FIG. 3 is a bottom view of the side sill shown in FIG. 1.
Figure 4A:
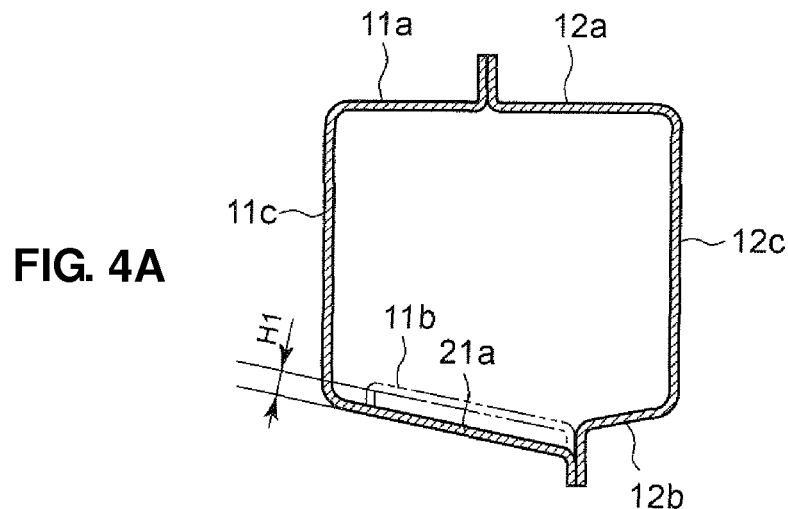
FIGS. 4A, 4B and 4C are sectional views of the side sill, respectively, taken along lines Y4a-Y4a, Y4b-Y4b and Y4c-Y4c of FIG. 3.
Figure 4B:
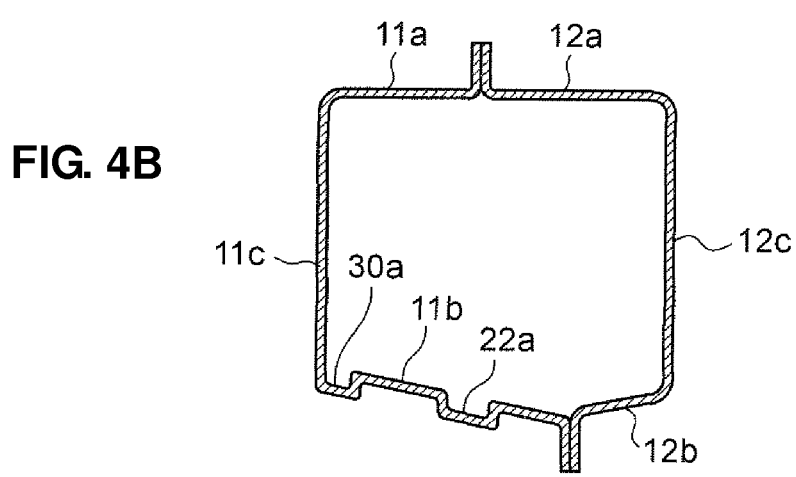
Figure 4C:
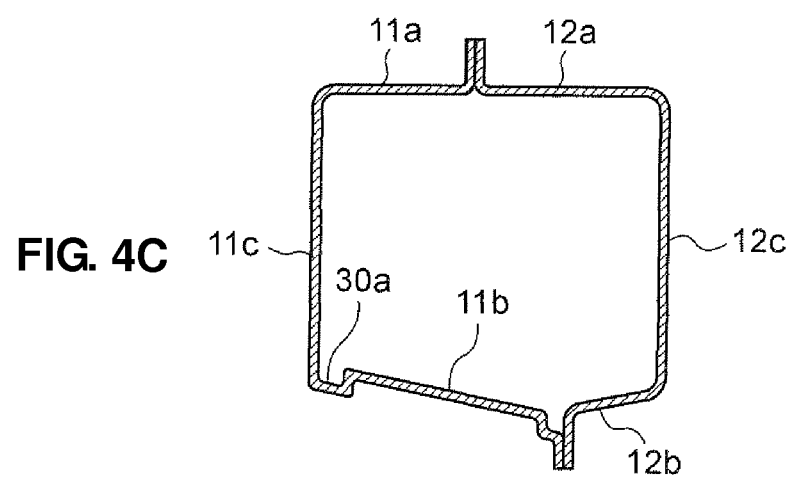
Figure 5:
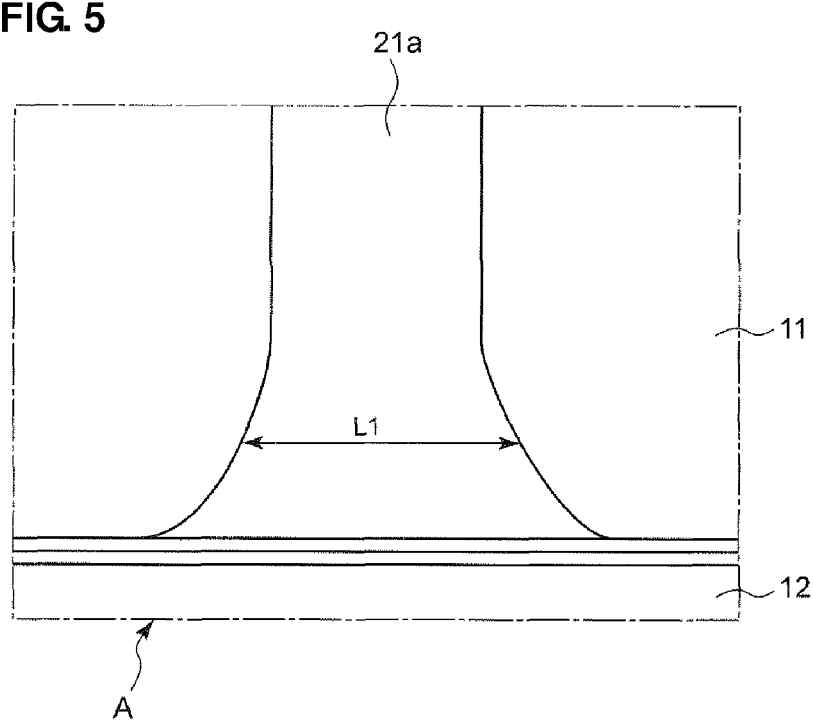
FIG. 5 is an enlarged view of a major part of an A portion of the side sill shown in FIG. 3.

Hereinafter, the frame for a vehicle according to some specific embodiments of the present invention will be described. FIG. 1 is a perspective view showing a side sill of the frame for a vehicle according to a first embodiment of the present invention. FIG. 2 is a perspective view showing a side sill outer of the side sill. FIG. 3 is a bottom view of the side sill shown in FIG. 1. FIGS. 4A, 4B and 4C are sectional views of the side sill, respectively, taken along lines Y4a-Y4a, Y4b-Y4b and Y4c-Y4c of FIG. 3. FIG. 5 is an enlarged view of a major part of an A portion of the side sill shown in FIG. 3.

As shown in FIG. 1, a side sill 10 as a vehicle-body frame to which the frame for a vehicle according to the first embodiment of the present invention is arranged at a vehicle-body lower portion and extends in a vehicle longitudinal direction, which is formed to have a closed cross section by a side sill outer 11 extending in the vehicle longitudinal direction and forming part of an outer face of the vehicle body and a side sill inner 12 extending in the vehicle longitudinal direction and forming part of an inner face of the vehicle body.

Specifically, the side sill outer 11 comprises an upper face portion 11a extending substantially horizontally, a lower face portion 11b located below the upper face portion 11a and extending substantially horizontally, and a side face portion 11c extending substantially vertically from the lower face portion 11b to the upper face portion 11a. The side face portion 11c of the side sill outer 11 protrudes outwardly.

Further, an upper flange portion 11d is formed at an inward end portion of the upper face portion 11a of the side sill outer 11 to extend upwardly from the upper face portion 11a, and a lower flange portion 11e is formed at an inward end portion of the lower face portion 11b of the side sill outer 11 to extend downwardly from the lower face portion 11b. The side sill outer 11 is formed to have a substantially U-shaped cross section.

Meanwhile, the side sill outer 12 comprises an upper face portion 12a extending substantially horizontally, a lower face portion 12b located below the upper face portion 12a and extending substantially horizontally, and a side face portion 12c extending substantially vertically from the lower face portion 12b to the upper face portion 12a. The side face portion 12c of the side sill inner 12 protrudes outwardly.

Likewise, an upper flange portion 12d is formed at an outward end portion of the upper face portion 12a of the side sill inner 12 to extend upwardly from the upper face portion 12a, and a lower flange portion 12e is formed at an outward end portion of the lower face portion 12b of the side sill inner 12 to extend downwardly from the lower face portion 12b. The side sill inner 12 is formed to have a substantially U-shaped cross section.

The side sill outer 11 and the side sill inner 12 are joined together in such a manner that the upper flange portion 11d is joined to the upper flange portion 12d and the lower flange portion 11e is joined to the lower flange portion 12e, thereby forming the side sill 10 in a closed-section shape.

In the side sill 10, a ridgeline 11f is formed between the upper face portion 11a and the side face portion 11c of the side sill outer 11, a ridgeline 11g is formed between the lower face portion 11b and the side face portion 11c of the side sill outer 11, a ridgeline 12f is formed between the upper face portion 12a and the side face portion 12c of the side sill inner 12, and a ridgeline 12g is formed between the lower face portion 12b and the side face portion 12c of the side sill inner 12. The side sill 10 is formed in the substantially-rectangular closed-section shape.

As described above, when it acts on the side sill 10 from the outside in a vehicle side collision or the like, the load is inputted from the side face portion 11c of the side sill outer 11 which protrudes outwardly. In this case, a specified portion of the side sill 10 to which the load is inputted bends inwardly, a compressive force acts on the side face portion 11c of the side sill outer 11 from the both side ends of the side sill 10 and a compressive stress generates at this side face portion 11c, and a tensional force acts on the side face portion 12c of the side sill inner 12 from the both side ends of the side sill 10 and a tensional stress generates at this side face portion 12c.

As shown in FIGS. 2-4A, B, C, the side sill 10 according to the present embodiment further comprises a lateral reinforcement potion 20 which is provided at the lower face portion 11b of the side sill outer 11 and extends in a line shape in a specified direction across the side sill 10 from the side face portion 11c of the side sill outer 11 toward the side face portion 12c of the side sill inner 12.

The lateral reinforcement portion 20 comprises three kinds of reinforcement portions of a first lateral reinforcement portion 21 extending in a sectional direction perpendicular to the longitudinal direction of the side sill 10, a second lateral reinforcement portion 22 extending in a first slant direction relative to the longitudinal direction of the side sill 10 (i.e., extending obliquely outwardly and rearwardly in the vehicle body as shown in FIG. 3), and a third lateral reinforcement portion 23 extending in a second slant direction relative to the longitudinal direction of the side sill 10 (i.e., extending obliquely outwardly and forwardly in the vehicle body as shown in FIG. 3), the first slant direction and the second slant direction being set to be opposite to each other.

Specifically, the first lateral reinforcement portion 21 is comprised of a first bead 21a which projects toward the outside of the side sill 10 so as to have a substantially U-shaped cross section, which is arranged to extend in the sectional direction perpendicular to the longitudinal direction of the side sill 10 over the width of the lower face portion 11b of the side sill outer 11. Further, as shown in FIG. 4A which illustrates a specified cross section of the lower face portion 11b of the side sill outer 11 taken along line Y4c-Y4c of FIG. 3 with a two-dotted broken line, the first bead 21a is configured to have a constant bead projection amount H1 from the lower face portion 11b in the sectional direction of the side sill 10.

The second lateral reinforcement portion 22 is comprised of a second bead 22a which projects toward the outside of the side sill 10 so as to have a substantially U-shaped cross section, which is arranged to extend in the first slant direction having a slant angle of about 45 degrees relative to the longitudinal direction of the side sill 10 over the width of the lower face portion 11b of the side sill outer 11.

Meanwhile, while the third lateral reinforcement portion 23 is comprised of a third bead 23a which projects toward the outside of the side sill 10 so as to have a substantially U-shaped cross section, the third bead 23a is arranged to extend in the second slant direction, which is opposite to the above-described first slant direction, having a slant angle of about 45 degrees relative to the longitudinal direction of the side sill 10 over the width of the lower face portion 11b of the side sill outer 11.

Herein, the second and third beads 22a, 23a are configured to have a constant bead projection amount from the lower face portion 11b in the sectional direction of the side sill 10 as well. The constant bead projection of the second or third beads 22a, 23a may be set to the bead projection amount H1 of the first bead 21a, for example.

Further, as shown in FIG. 5, the first bead 21a is configured to have a width L1 which becomes wider toward the side face portion 12c of the side sill inner 12 from the side face portion 11c of the side sill outer 11 in the sectional direction of the side sill 10. Likewise, the second bead 22a and the third bead 23a are configured to have a width L which becomes wider toward the side face portion 12c of the side sill inner 12 from the side face portion 11c of the side sill outer 11 in the sectional direction of the side sill 10 as well.

According to the above-described arrangement of the width of the first, second and third beads 21a, 22a, 23a of the lateral reinforcement portion 20, the lateral reinforcement portion 20 which extends in the line shape at the lower face portion 12b of the side sill outer 11 forming the ridgeline 11g together with the side face portion 11c of the side sill outer 11 can be effectively restrained from having buckling.

As shown in FIG. 2, at the side sill 10 are also formed the third bead 23a, the first bead 21a, the second bead 22a, the first bead 21a, the third bead 23a, the first bead 21a, and the second bead 22a which are located in order from the vehicle-body front side along the longitudinal direction of the side sill 10. Thus, the first lateral reinforcement portion 21, the second lateral reinforcement portion 22, the first lateral reinforcement portion 21, the third lateral reinforcement portion 23, and the first lateral reinforcement portion 21 are located in order along the longitudinal direction of the side sill 10.

Further, three beads 23a, 21a, 22a located on the vehicle-body front side and three beads 23a, 21a, 22a located on the vehicle-body rear side are respectively joined together at the vehicle-inward end of the lower face portion 11b of the side sill outer 11. Meanwhile, three beads 22a, 21a, 23a located on the central position in the vehicle longitudinal direction are joined together at the vehicle-outward end of the lower face portion 11b of the side sill outer 11.

According to the present embodiment, the two beads of the first bead 21a and the second bead 22a or the first bead 21a and the third bead 23a, which are adjacent to each other in the longitudinal direction of the side sill 10, are respectively joined together at an one end portion, in the sectional direction of the side sill 10, of the lower face portion 11b of the side sill outer 11, and form a substantially triangular area S together with the other end portion of the lower face portion 11b of the side sill outer 11.

For example, as shown in FIG. 3, the third bead 23a which is located on the vehicle-body front side in the longitudinal direction of the side sill 10 and the first bead 21a which is adjacent to the third bead 23a are joined together at the inward (vehicle-inside) end portion of the lower face portion 11b of the side sill outer 11, and these beads 23a, 21a form a substantially triangular area S1 together with the outward (vehicle-outside) end portion of the lower face portion 11b of the side sill outer 11.

As described above, the lateral reinforcement portion 20 comprises at least two lateral reinforcement portions which are adjacent to each other in the longitudinal direction of the side sill 10, specifically the first lateral reinforcement portion 21 and the second lateral reinforcement portion 22 or the first lateral reinforcement portion 21 and the third lateral reinforcement portion 23 are joined together at the one end portion, in the sectional direction of the side sill 10, of the lower face portion 11b of the side sill outer 11 and form the substantially triangular area S together with the other end portion of the lower face portion 11b of the side sill outer 11. Thereby, the buckling resistance of the lower face portion 11b of the side sill outer 11 can be increased effectively with a relatively simple structure.

Further, the first bead 21a, the second bead 22a, and the third bead 23a are configured not to cross each other at a central position, in the sectional direction of the side sill 10, of the lower face portion 11b of the side sill outer 11. That is, the lateral reinforcement portion 20 comprises plural lateral reinforcement portions which do not cross each other at the central position, in the sectional direction of the side sill 10, of the lower face portion 11b of the side sill outer 11. Thereby, the bending strength of the side sill 10 can be increased more properly, compared with a case in which plural lateral reinforcement portions of the lateral reinforcement portion 20 cross each other at the central position, in the sectional direction of the frame, of the lower face portion 11b of the side sill outer 11s.

Herein, the lateral reinforcement portion 20 of the present embodiment comprises the first lateral reinforcement portion 21, the second lateral reinforcement portion 22, and the third lateral reinforcement portion 23. However, the lateral reinforcement portion may comprise at least two of the first lateral reinforcement portion 21, the second lateral reinforcement portion 22, and the third lateral reinforcement portion 23. For example, it may comprise the first lateral reinforcement portion 21 and the second lateral reinforcement portion 22, or the second lateral reinforcement portion 22 and the third lateral reinforcement portion 23, or the third lateral reinforcement portion 23 and the first lateral reinforcement portion 21.

Further, in the present embodiment, the two lateral reinforcement portions 21, 22 or 21, 23, which are adjacent to each other in the longitudinal direction of the side sill 10, are joined together respectively at the one end portion, in the sectional direction of the side sill 10, of the lower face portion 11b of the side sill outer 11. It may be configured such that the two adjacent lateral reinforcement portions are not joined together at the one end portion of the lower face portion 11b of the side sill outer 11.

Moreover, a longitudinal reinforcement portion 30 which extends in the longitudinal direction of the side sill 10 in the line shape is provided at a specified position of the lower face portion 11b of the side sill outer 11 having the lateral reinforcement portion 20 which is located near the ridgeline 11g. This longitudinal reinforcement portion 30 is comprised of a fourth bead 30a which projects toward the outside of the side sill 10 so as to have a substantially U-shaped cross section, which extends over the longitudinal direction of the side sill 10.

The fourth bead 30a is joined to respective outward (vehicle-outside) end portions of the first bead 21a, the second bead 22a, and the third bead 23a. Thus, the substantially triangular area S which is formed by the two adjacent beads 21a, 22a or 21a, 23a which are joined together at the inward (vehicle-inside) end portion of the lower face portion 11b of the side sill outer 11 and the outward (vehicle-outside) end portion of the lower face portion 11b of the side sill outer 11 is concretely formed by the two adjacent beads 21a, 22a or 21a, 23a and the fourth bead 30a.

The projection amount of the fourth bead 30a from the lower face portion 11b is set to be constant over the longitudinal direction of the side sill 10. The projection amount of the fourth bead 30a may be set to be substantially equal to that of the first bead 21a, the second bead 22a and the third bead 23a like the present embodiment.

The lateral reinforcement portion 20 and the longitudinal reinforcement portion 30 are provided at the lower face portion 11b of the side sill outer 11 of the side sill 10 of the present embodiment, however, they may be provided at the upper face portion 11a of the side sill outer 11, or at both the upper face portion 11a and the lower face portion 11b of the side sill outer 11, respectively.

Further, while the lateral reinforcement portion 20 and the longitudinal reinforcement portion 30 of the present embodiment are comprised of the beads 21a, 22a, 23a, 30a projecting toward the outside of the side sill 10, they may be comprised of beads projecting toward the inside of the side sill 10. Also, they may be formed to project toward the outside or the inside of the side sill 10 by means for welding.

As described above, the frame (side frame) 10 for a vehicle according to the first embodiment of the present invention comprising the first face portion (the side face portion of the side sill outer) 11c on which the compressive force acts when the load acts from the outside, the second face portion (the side face portion of the side sill inner) 12c on which the tensional force acts, a pair of third face portions (the upper and lower face portions of the side sill outer) 11a, 11b located between the first face portion 11c and the second face portion 12c of the frame 10 and forming the ridgelines 11f, 11b together with the first face portion 11c, and the lateral reinforcement potion 20 provided at least at one of the third face portions 11a, 11b and extending in the line shape from the first face portion 11c toward the second face portion 12c.

Thereby, the third face portions 11a, 11b forming the ridgelines 11f, 11g together with the first face portion 11c can be reinforced by the lateral reinforcement portion 20, so that the buckling of the third face portions 11a, 11b of the frame 10 can be restrained when the load acts from the outside. Accordingly, the bending strength of the frame 10 can be increased. Since the buckling of the third face portions 11a, 11b of the frame 10 can be restrained when the load acts from the outside, the load can be transmitted to the second face portion 11c via the third face portions 11a, 11b. Accordingly, the bending strength of the frame 10 can be effectively increased.

Further, since the lateral reinforcement portion 20 comprises at least two of the first lateral reinforcement portion 21, the second lateral reinforcement portion 22, and the third lateral reinforcement portion 23, the bending strength of the frame 10 against the load acting on the first face portion 11c of the frame 10 from the outside can be increased, compared with a case in which a reinforcement portion extending in the longitudinal direction of the frame 10 in the line shape.

Moreover, since the longitudinal reinforcement portion 30 extending in the longitudinal direction of the frame 10 in the line shape is provided at the specified position of the third face portions 11a, 11b which is located near the ridgelines 11f, 11g, when it acts from the outside, the load can be transmitted and dispersed along the longitudinal direction of the frame 10 in the vicinity of the ridgelines 11f, 11g. Accordingly, the above-described effects can be provided more effectively.

Figure 6:
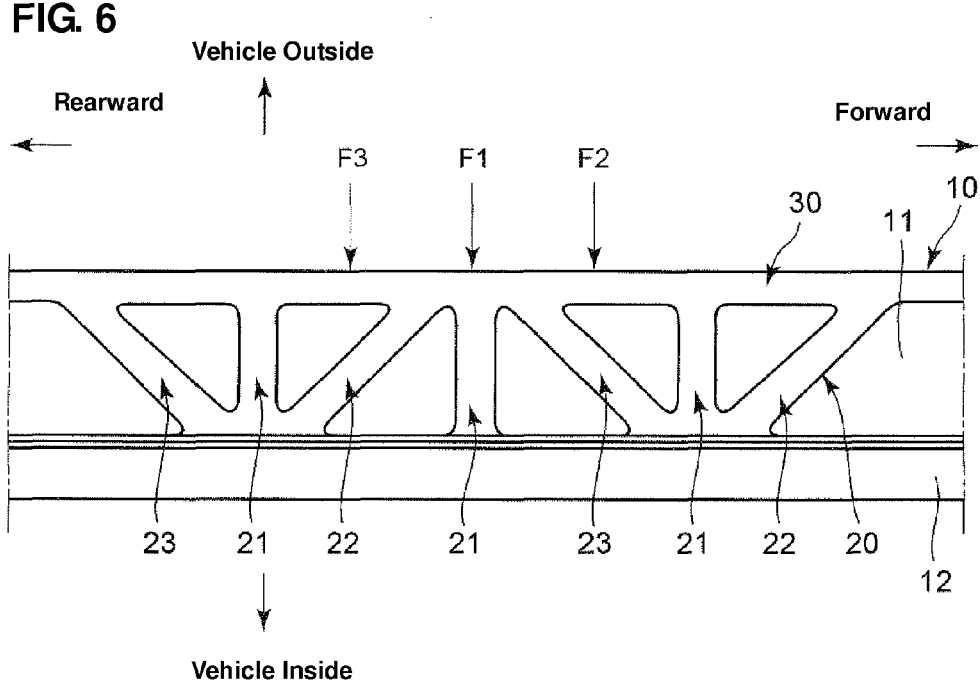
FIG. 6 is an explanatory diagram to explain an operation of a longitudinal reinforcement portion provided at the side sill.

FIG. 6 is an explanatory diagram to explain an operation of a longitudinal reinforcement portion provided at the side sill. Even in case in which there are different potions on which the load acts from the outside in the longitudinal direction of the side sill 10 as shown by arrows F1, F2 and F3 in FIG. 6, the load can be dispersed to the side sill along its longitudinal direction via the longitudinal reinforcement portion 30. Thus, the load can be dispersed to the first lateral reinforcement portion 21, the second lateral reinforcement portion 22, and the third lateral reinforcement portion 23 which are connected to the longitudinal reinforcement portion 30.

In the present embodiment, reaction forces against the load which acts on the side sill 10 of the first embodiment of the present invention from the outside via the pressing force as shown in FIGS. 17A-17D and 18A-18D were evaluated through the simulation analysis. This analysis evaluated, in addition to the side sill 10 (a sample 1), a side sill having the lateral reinforcement portion 20 without the longitudinal reinforcement portion 30 (a sample 2), a side sill having the second and third lateral reinforcement portions 22, 23 of the lateral reinforcement portion 20 without the first lateral reinforcement portion 21 of the lateral reinforcement portion 20 and the longitudinal reinforcement portion 30 (a sample 3), and a side sill without the lateral reinforcement portion 20 and the longitudinal reinforcement portion 30 (a comparative sample).

Figure 7:
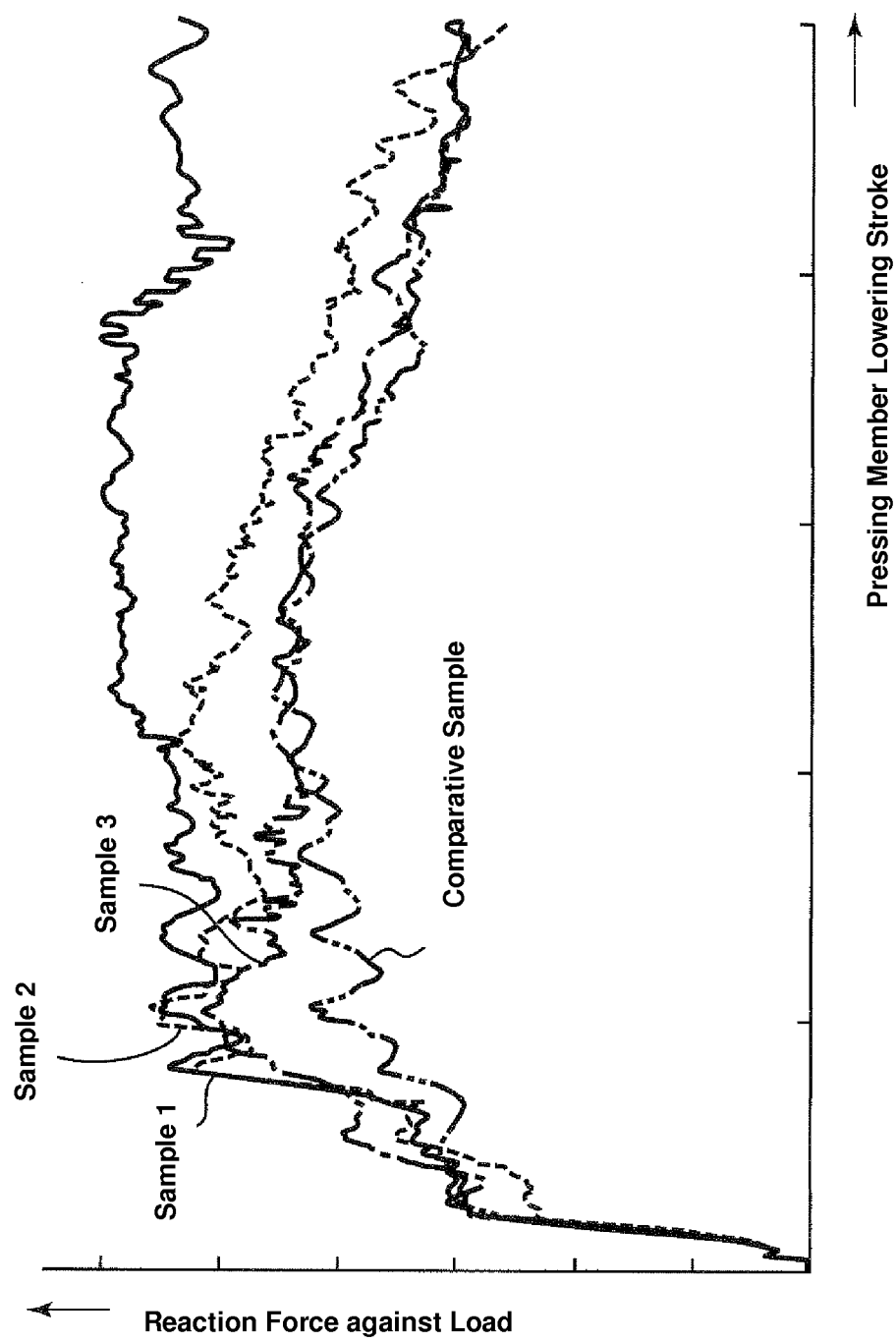
FIG. 7 is a graph showing a relationship of a lowering stroke of a pressing member to apply a load to the side sill and a reaction force against the load according to the side sill of frame for a vehicle of the first embodiment of the present invention.

FIG. 7 is a graph showing a relationship of a lowering stroke of the pressing member to apply the load to the side sill and the reaction force against the load according to the side sill of frame for a vehicle according to the first embodiment of the present invention. In FIG. 7, the sample 1 is shown by a solid line, the sample 2 is shown by a broken line, the sample 3 is shown by a one-dotted broken line, and a comparative sample is shown by a two-dotted broken line.

As shown in FIG. 7, the analysis showed results that the samples 1, 2 and 3 had their maximum reaction forces against the load acting from the outside which are greater than that of the comparative sample, and the maximum reaction forces of these samples are greater in order of the sample 1, the sample 2, and the sample 3.

Figure 8:
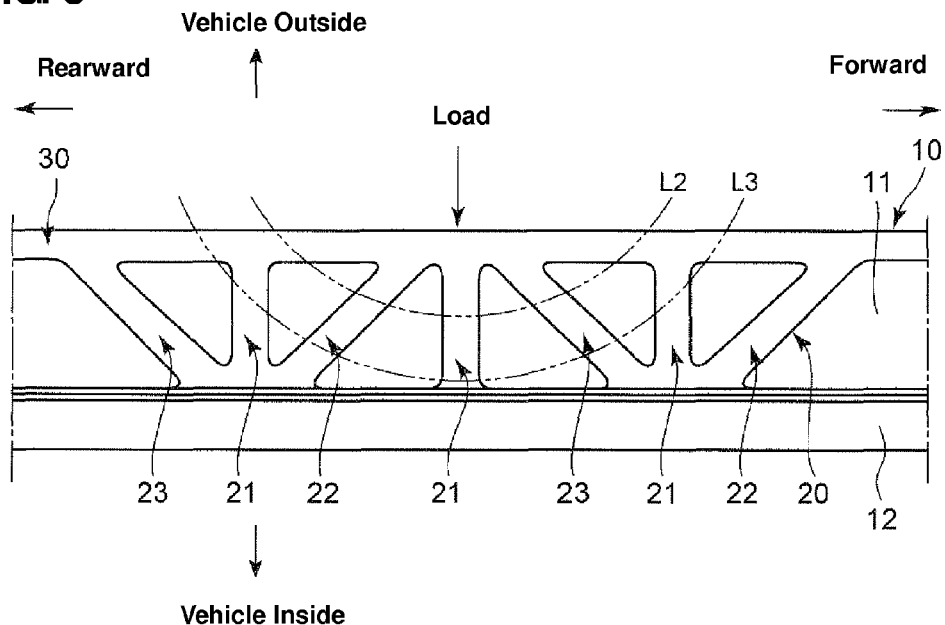
FIG. 8 is an explanatory diagram to explain an operation of a first lateral reinforcement portion provided at the side sill.

Herein, one reason why the maximum reaction force of the sample 2 was greater than that of the sample 3 may be considered as follows. FIG. 8 is an explanatory diagram to explain an operation of a first lateral reinforcement portion provided at the side sill. As shown in FIG. 8, when acting on the side sill from the outside, the load transmits in a half-circular shape around its input center as shown by lines L2, L3 in FIG. 8, thereby causing a face deformation.

Herein, the second lateral reinforcement portion 22 and the third lateral reinforcement portion 23 which are formed at the both end portion, in the longitudinal direction, of the side sill 10 are positioned substantially in parallel to the line L2 and the line L3, respectively. Accordingly, these portions 22, 23 may deform more easily than a case in which they are not positioned substantially in parallel to the lines L2, L3. Herein, forming the first lateral reinforcement portion 21 located adjacently to the second lateral reinforcement portion 22 and the third lateral reinforcement portion 23 respectively can restrain the above-described cause of the face deformation. This may be considered as one reason why the maximum reaction force of the sample 2 was greater than that of the sample 3.

Hereinafter, a forming method of the side sill 10 described above will be described. As described, the side sill 10 comprises the side sill outer 11 and the side sill inner 12, and these members 11, 12 may be formed through a press forming of a metal-made plate member (plate-shaped work), such as a steel plate, respectively.

Figure 9:
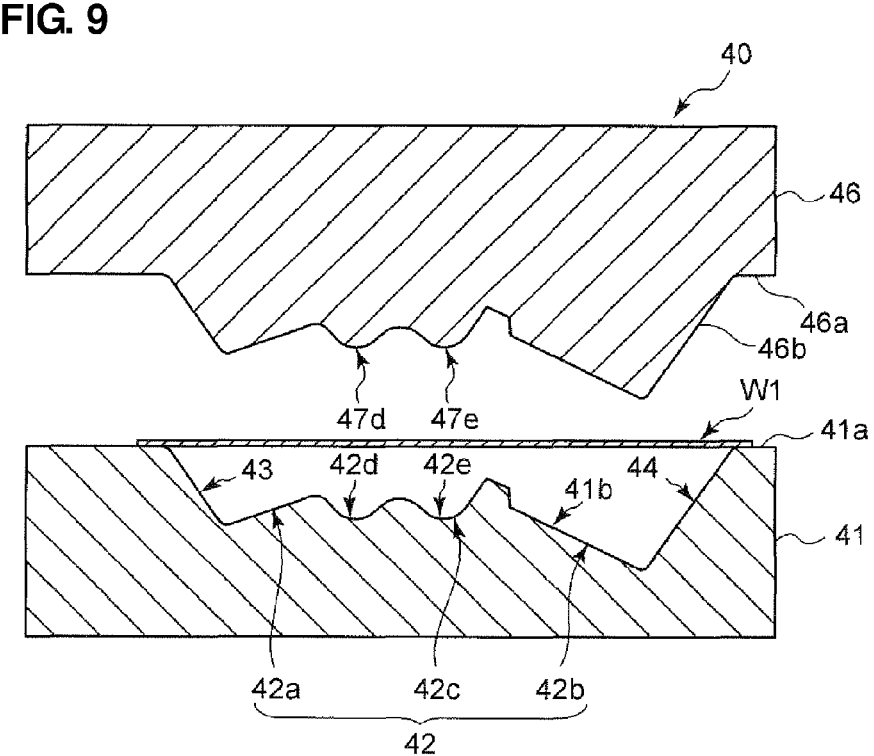
FIG. 9 is an explanatory diagram to explain a first forming process to form the side sill outer shown in FIG. 2 from a plate-shaped work.

FIG. 9 is an explanatory diagram to explain a first forming process to form the side sill outer shown in FIG. 2 with the plate-shaped work. As shown in FIG. 9, a plate-shaped work W1 is formed by using a first press forming mold 40 which comprises a lower mold 41 and an upper mold 46. The lower mold 41 is provided to hold to the plate-shaped work W1, and the upper mold 46 is provided to move relatively to the lower mold 41.

The lower mold 41 of the first press forming mold 40 has a groove portion 41b which concaves downwardly at its upper face 41a. The groove portion 41b comprises a bottom wall portion 42 which includes a first bottom wall portion 42a having a specified contour corresponding to the upper face portion 11a of the side sill outer 11, a second bottom wall portion 42b having a specified contour corresponding to the lower face portion 11b of the side sill outer 11, and a third bottom wall portion 42c having a specified contour corresponding to the side face portion 11c of the side sill outer 11, and vertical wall portion 43, 44 which extend obliquely upwardly from the both sides of the bottom wall portion 42 and have specified contours corresponding to the upper and lower flange portions 11d, 11e of the side sill outer 11. The first wall portion 42a and the second wall portion 42b are formed in the same shapes as the upper face portion 11a and the lower face portion 11b of the side sill outer 11, and the third bottom wall portion 42c is formed to have two concave portions 42d, 42e which concave downwardly.

Meanwhile, the upper mold 46 of the first press forming mold 40 has a projection portion 46b which projects downwardly at its lower face 46a. This projection portion 46b is formed to have a specified contour corresponding to the groove portion 41b of the lower mold 41, and includes two convex portions 47d, 47e which project downwardly so as to correspond to the concave portions 42d, 42e of the lower mold 41.

Figure 10:
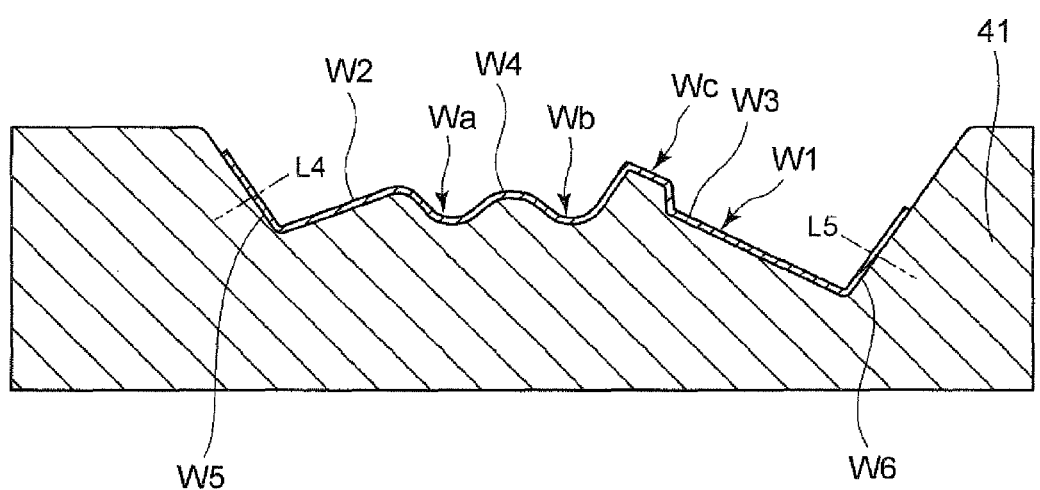
FIG. 10 is a sectional view showing the plate-shaped work formed in the first forming process.

Herein, the upper mold 46 is moved downwardly in a state in which the lower mold 41 holds the plate-shaped work W1 and then forms the plate-shaped work W1 together with the lower mold 41. FIG. 10 is a sectional view showing the plate-shaped work formed in the first forming process, which illustrates a state in which the plate-shaped work is held at the lower mold. As shown in FIG. 10, the plate-shaped work W1 is formed in a specified shape through pressing, which comprises a first bottom wall portion W2 corresponding to the upper face portion 11a of the side sill outer 11, a second bottom wall portion W3 corresponding to the lower face portion 11b of the side sill outer 11, a third bottom wall portion W4 corresponding to the side face portion 11c of the side sill outer 11, a first vertical wall portion W5 corresponding to the upper flange portion 11d of the side sill outer 11, and a second vertical wall portion W6 corresponding to the lower flange portion 11e of the side sill outer 11.

At the third bottom wall portion W4 are provided two convex portions Wa, Wb which are formed by the convex portions 42d, 42e of the lower mold 41 and the convex portions 47d, 47e of the upper mold 46 and project downwardly.

The two convex portions Wa, Wb are arranged side by side to extend in the longitudinal direction of the plate-shaped work W1 in parallel to each other and have a curve-shaped cross section, respectively. Further, at the second bottom wall portion W3 is provided a bead We which is formed at the lower face portion 11b of the side sill outer 11. Herein, FIGS. 9 through 12A, B show the section of the side sill outer 12, respectively, taken along line Y4c-Y4c of FIG. 3.

After the plate-shaped work W1 is formed through the first forming process, a blanking treatment is applied by using blanking means, not illustrated, at blanking lines L4, L5 shown in FIG. 10, so that both end portions of the first and second vertical wall portions W5, W6 of the plate-shaped work W1 are cut off. Thus, the first and second vertical wall portions W5, W6 are formed in the shapes of the upper and lower flange portions 11d, 11e of the side sill outer 11, respectively.

Figure 11A:
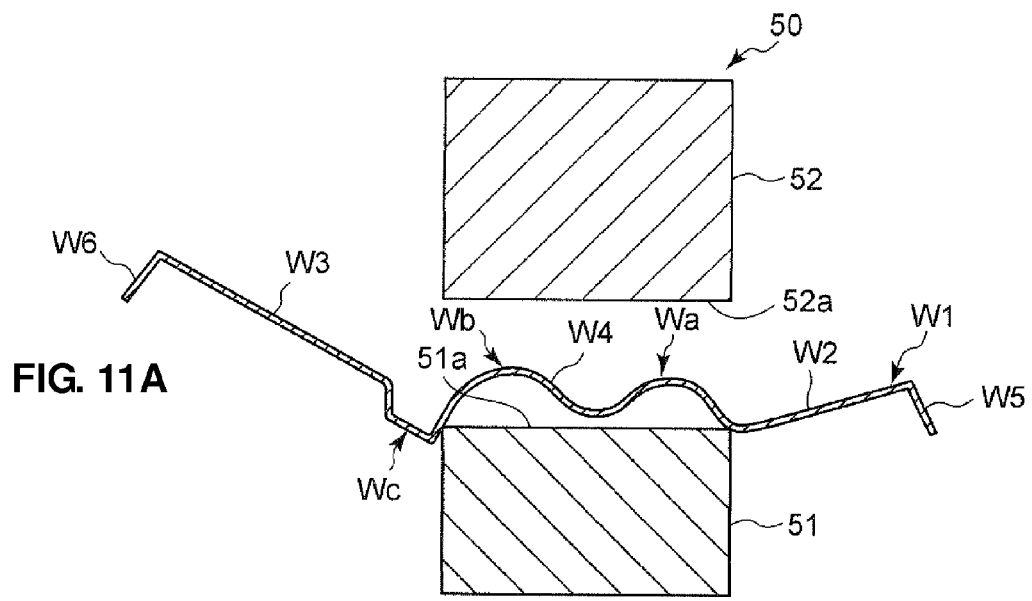
FIGS. 11A and 11B are explanatory diagrams to explain a second forming process to form the side sill outer from the plate-shaped work.
Figure 11B:
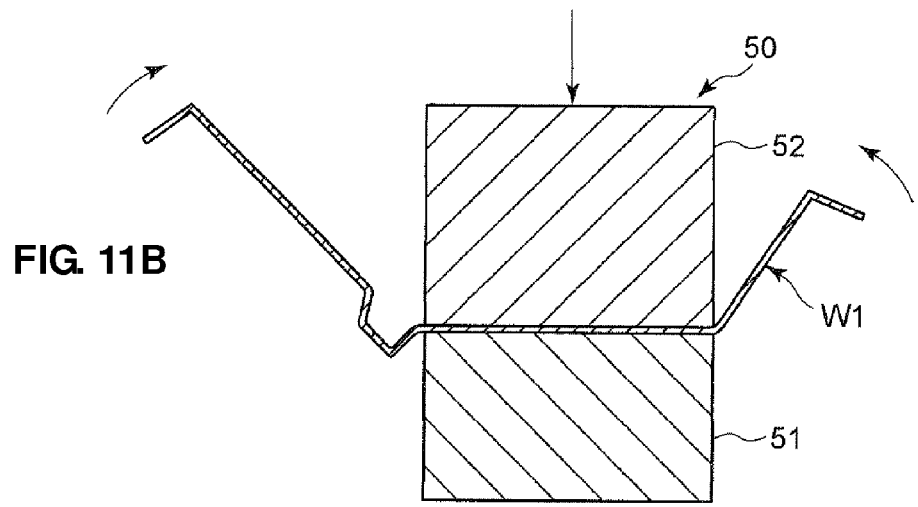

FIGS. 11A and 11B are explanatory diagrams to explain a second forming process to form the side sill outer from the plate-shaped work. As shown in FIGS. 11A, B, the plate-shaped work W1 is then pressed by using a second press forming mold 50 which comprises a first die 51 holding the plate-shaped work W1 and a punch 52 arranged above the first die 51 to press the two convex portions Wa, Wb of the plate-shaped work W1 in an opposite direction to their projection direction. Herein, as described later, the second press forming mold 50 further includes a second die 55 which is positioned above the first die 51.

As shown in FIG. 11A, in a state in which the third bottom wall portion W4 is held on the upper face 51a of the first die 51 with the convex portions Wa, Wb of the plate-shaped work W1 facing to the punch 52, the punch 52 is moved downwardly so that the two convex portions Wa, Wb are pressed in the opposite direction to their projection direction by the lower face 52a of the punch 52. Thereby, as shown in FIG. 11B, the two convex portions Wa, Wb are formed in a substantially flat shape by the lower face 52a of the punch 52 and the upper face 51a of the first die 51, thereby forming the side face portion 11c of the side sill outer 11.

When the two convex portions Wa, Wb are formed in the substantially flat shape, the first bottom wall portion W2 and the first vertical wall portion W5 of the plate-shaped work W1 are moved toward the inside of the plate-shaped work W1 counterclockwise in FIGS. 11A, B and the second bottom wall portion W3 and the second vertical wall portion W6 of the plate-shaped work W1 are moved toward the inside of the plate-shaped work W1 clockwise in FIGS. 11A, B.

Figure 12A:
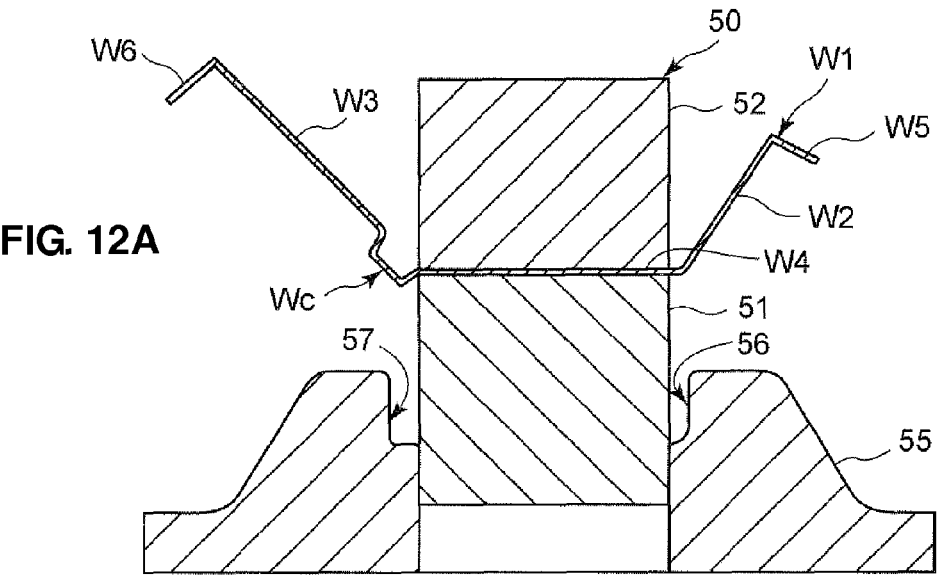
FIGS. 12A and 12B are explanatory diagrams to explain a third forming process to form the side sill outer from the plate-shaped work.
Figure 12B:
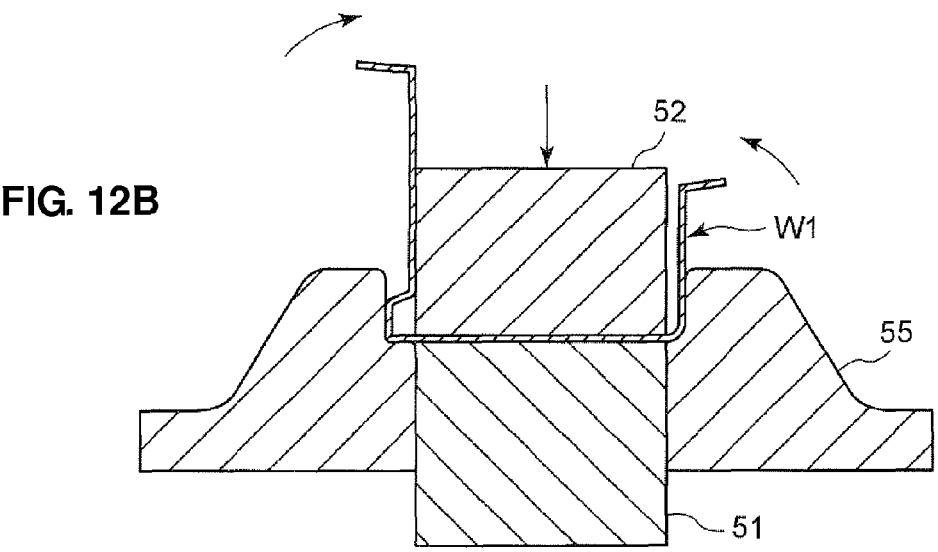

FIGS. 12A and 12B are explanatory diagrams to explain a third forming process to form the side sill outer from the plate-shaped work. As shown in FIGS. 12A, B, the second press forming mold 50 comprises a second die 55 which is positioned beside the first die 51, and the second die 55 has groove portions 56, 57 in the vicinity of the first die 51. The groove portions 56, 57 are formed so as to correspond to the respective shapes of the ridgelines 11f, 11g which are formed between the side face portion 11b and the upper face portion 11a, the lower face portion 11b of the side sill outer 11, respectively.

As shown in FIG. 12A, the plate-shaped work W1 is then moved downwardly from its state in which the work W1 is held by the punch 52 and the first die 51. Then, as shown in FIG. 12B, the first bottom wall portion W2 and the first vertical wall portion W5 of the plate-shaped work W1 are moved toward the inside of the plate-shaped work W1 counterclockwise in FIGS. 12A, B by the groove portions 56, 57 of the second die 55 and the second bottom wall portion W3 and the second vertical wall portion W6 of the plate-shaped work W1 are moved toward the inside of the plate-shaped work W1 clockwise in FIGS. 11A, B. Thus, the side sill outer 11 is formed.

As described, in a case in which the beads 21a, 22a, 23a, 30a are provided at the lower face portion 11b of the side sill outer 11 formed to have the substantially U-shaped cross section, the plate-shaped work can be formed through the press forming by a relatively simple method. Further, since the side sill inner 12 does not have any bead at the lower face portion 12a, the plate-shaped work can be formed to have the substantially U-shaped cross section by the press forming mold with the lower and upper molds corresponding to the shape of the side sill inner 12.

Figure 13A:
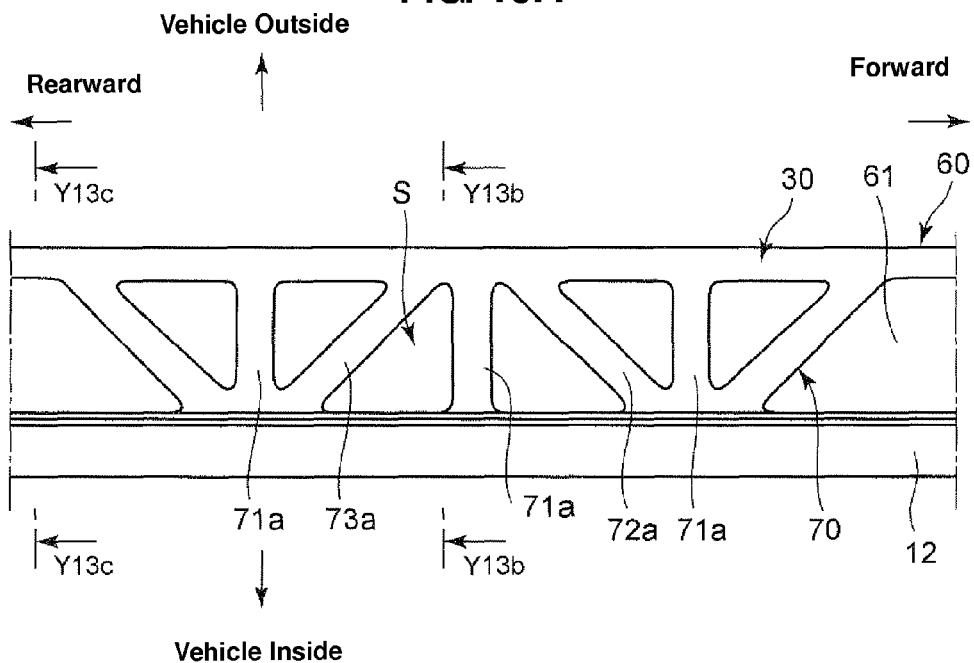
FIGS. 13A and 13B are explanatory diagrams to explain the frame for a vehicle according to a second embodiment of the present invention.
Figure 13B:
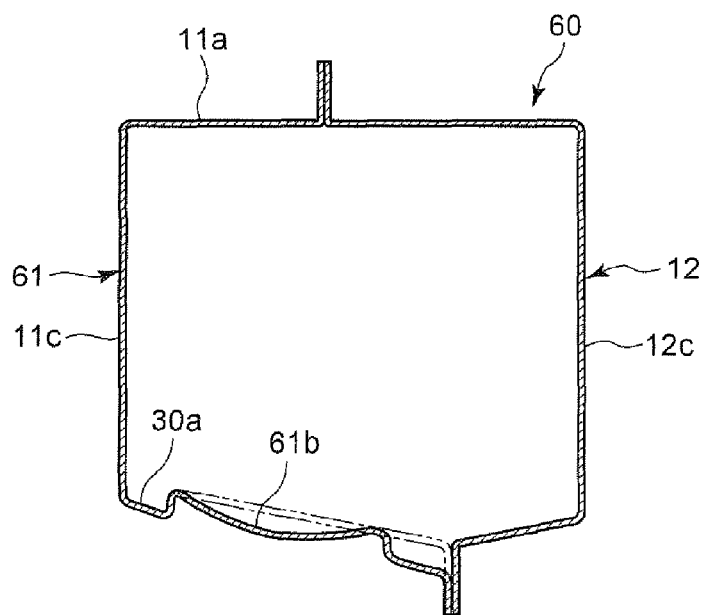

FIGS. 13A and 13B are explanatory diagrams to explain the frame for a vehicle according to a second embodiment of the present invention. FIG. 13A is a bottom view of the side sill of the frame for a vehicle according to the second embodiment of the present invention, and FIG. 13B is a sectional view taken along line Y13b-Y13b of FIG. 13A. The frame for a vehicle of the second embodiment is different from that of the first embodiment only in the lower face portion 11b of the side sill outer 11, so the same components performing the same operation are dented by the same reference characters, descriptions of which are omitted here. Herein, in FIG. 13B, the section of the lower face portion of the side sill outer taken along line Y13c-Y13c of FIG. 13A is illustrated by a two-dotted broken line.

As shown in FIG. 13A, a side sill 60 of the frame for a vehicle according to the second embodiment also has a lateral reinforcement portion 70 and the longitudinal reinforcement portion 30 at a lower face portion 61b of a side sill outer 61. The lower face portion 61b, as shown in FIG. 13B, is configured such that a central part of an area S which is enclosed by two beads which form adjacent lateral reinforcement portions in the longitudinal direction of the side sill 10, i.e., a first bead 71a and a second bead 72a, or the first bead 71a and a third bead 73a, and an end portion of the lower face portion 61b in the sectional direction of the side sill 60 protrudes in the bead projection direction more than an end portion of the area S.

As described, the third face portion (the lower face portion of the side sill outer) 61b is configured such that the central part of the area S enclosed by the two adjacent lateral reinforcement portions in the longitudinal direction of the frame (the side sill) 60 and the end portion of the third face portion 61b in the sectional direction of the frame 60 protrudes in the bead projection direction more than the end portion of the area S. Accordingly, the bead formed in the convex shape can be restrained from opening.

Figure 14A:
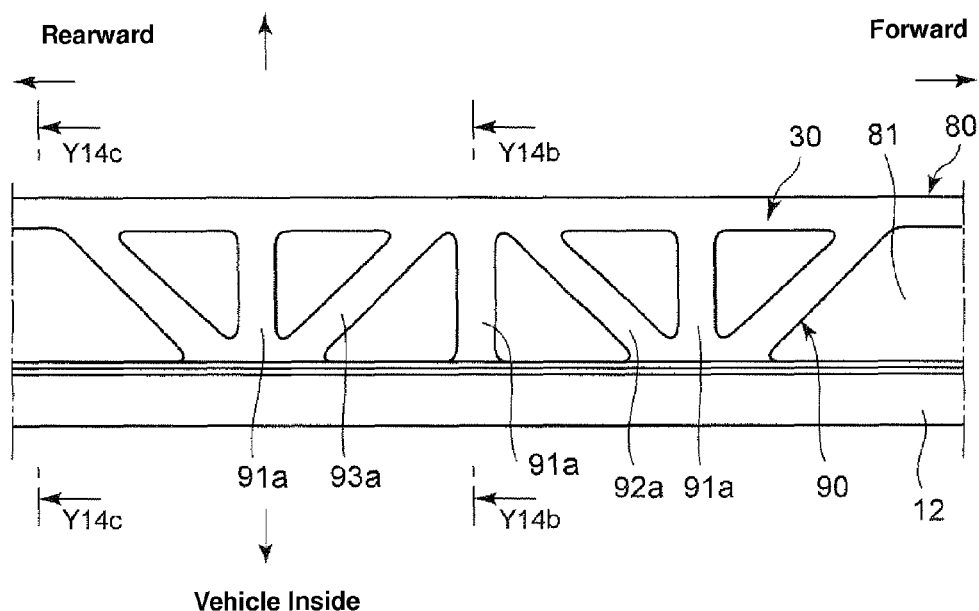
FIGS. 14A and 14B are explanatory diagrams to explain the frame for a vehicle according to a third embodiment of the present invention.
Figure 14B:
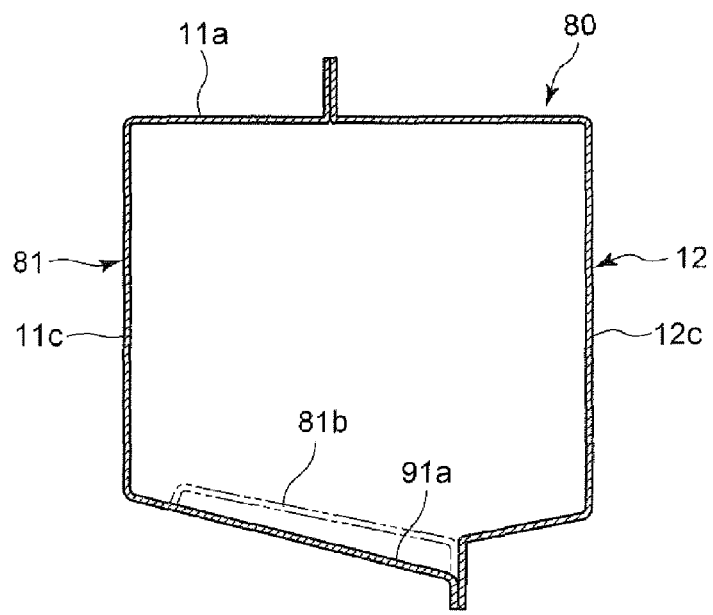

FIGS. 14A and 14B are explanatory diagrams to explain the frame for a vehicle according to a third embodiment of the present invention. FIG. 14A is a bottom view of the side sill of the frame for a vehicle according to the third embodiment of the present invention, and FIG. 14B is a sectional view taken along line Y14b-Y14b of FIG. 14A. The frame for a vehicle of the third embodiment is different from that of the first embodiment only in the shape of the lateral reinforcement portion, so the same components performing the same operation are dented by the same reference characters, descriptions of which are omitted here. Herein, in FIG. 14B, the section of the lower face portion of the side sill outer taken along line Y14c-Y14c of FIG. 14A is illustrated by a two-dotted broken line.

As shown in FIG. 14A, a side sill 80 of the frame for a vehicle according to the third embodiment also has a lateral reinforcement portion 90 and the longitudinal reinforcement portion 30 at a lower face portion 81b of a side sill outer 81. A first bead 91a which forms the first lateral reinforcement portion, as shown in FIG. 14B, is configured such that a bead projection amount becomes greater along a direction from the side face portion 11c of the side sill outer 81 to the side face portion 12c of the side sill inner 12.

Likewise, a second bead 92a which forms the second lateral reinforcement portion or a third bead 93a which forms the third lateral reinforcement portion are configured such that their bead projection amounts become greater along the direction from the side face portion 11c of the side sill outer 81 to the side face portion 12c of the side sill inner 12.

As described above, the lateral reinforcement portion 90 is configured such that the bead projection amount becomes greater along the direction from the first face portion (the side face portion of the side sill outer) 11c to the second face portion (the side face portion of the side sill inner) 12c. Thereby, in a case in which the first face portion 11c and the third face portion (the lower face portion of the side sill inner) 81b of the frame (side sill) 80 are formed integrally through a press forming of a plate member, the effect of reinforcing the third face portion can be increased effectively, maintaining a proper press forming by making the amount of deformation at a central portion of the plate member smaller than that of deformation at an end portion of the plate member.

Figure 15A:
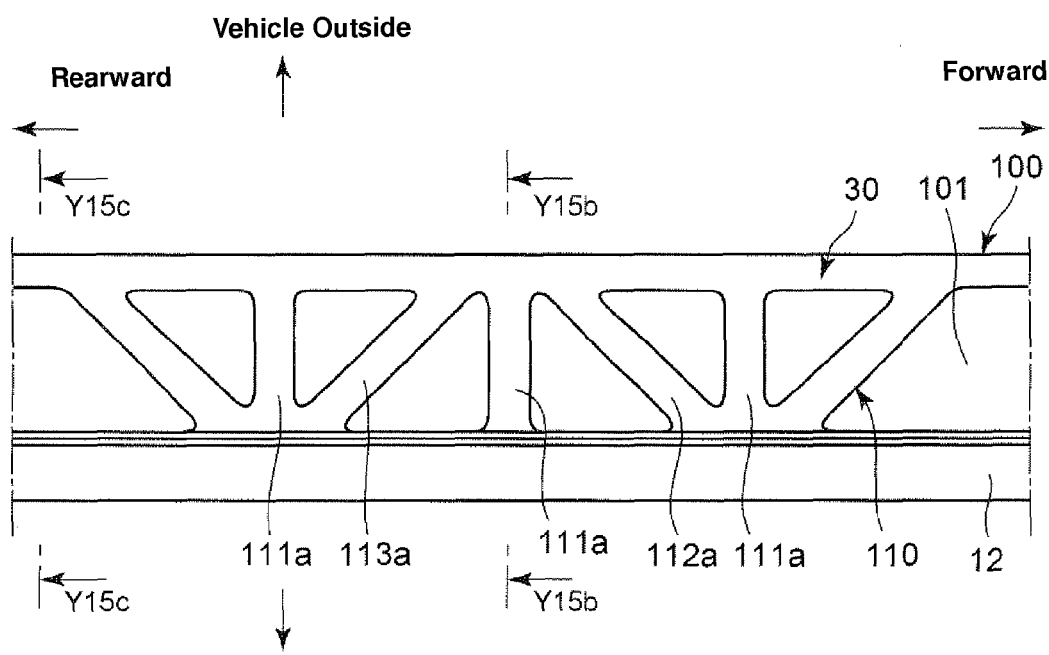
FIGS. 15A and 15B are explanatory diagrams to explain the frame for a vehicle according to a fourth embodiment of the present invention.
Figure 15B:
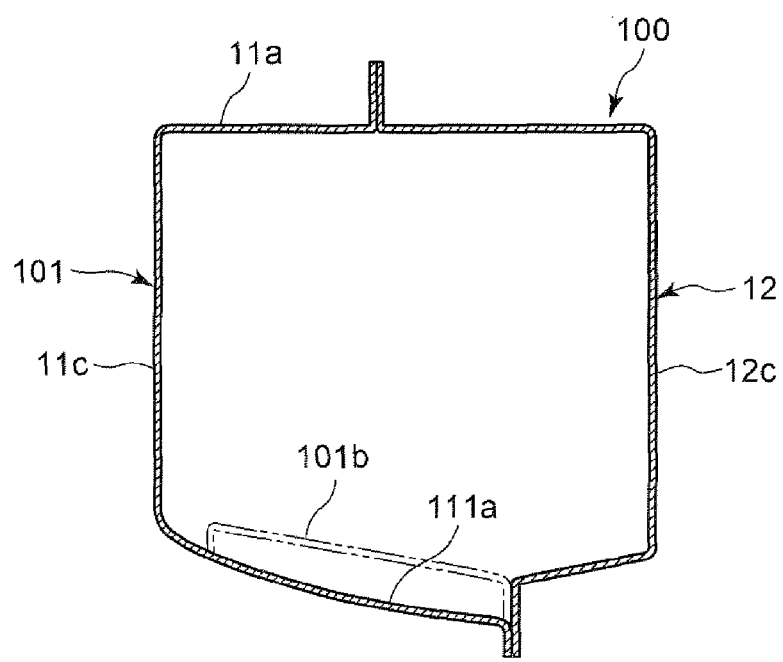

FIGS. 15A and 15B are explanatory diagrams to explain the frame for a vehicle according to a fourth embodiment of the present invention. FIG. 15A is a bottom view of the side sill of the frame for a vehicle according to the fourth embodiment of the present invention, and FIG. 15B is a sectional view taken along line Y15b-Y15b of FIG. 15A. The frame for a vehicle of the fourth embodiment is different from that of the first embodiment only in the shape of the lateral reinforcement portion, so the same components performing the same operation are dented by the same reference characters, descriptions of which are omitted here. Herein, in FIG. 15B, the section of the lower face portion of the side sill outer taken along line Y15c-Y15c of FIG. 15A is illustrated by a two-dotted broken line.

As shown in FIG. 15A, a side sill 100 of the frame for a vehicle according to the fourth embodiment also has a lateral reinforcement portion 110 and the longitudinal reinforcement portion 30 at a lower face portion 101b of a side sill outer 101. A first bead 111a which forms the first lateral reinforcement portion, as shown in FIG. 15B, is configured in a curve shape to project toward an outside of the side sill 100 from an end side, in the cross direction of the side sill 100, of the lower face portion 101b of the side sill outer 101 toward a central side, in the cross direction of the frame, of the lower face portion 101b of the side sill outer 101.

Likewise, a second bead 112a which forms the second lateral reinforcement portion or a third bead 113a which forms the third lateral reinforcement portion are configured in the curve shape to project toward the outside of the side sill 100 from the end side, in the cross direction of the side sill 100, of the lower face portion 101b of the side sill outer 101 toward the central side, in the cross direction of the side sill 100, of the lower face portion 101b of the side sill outer 101.

As described above, the lateral reinforcement portion 110 is configured in the curve shape to project toward the outside of the frame (side sill) 100 from the end side, in the cross direction of the frame 100, of the third face portion (the lower face portion of the side sill outer) 101b toward the central side, in the cross direction of the frame, of the third face portion (the lower face portion of the side sill outer) 101b. Thereby, the buckling of the bead can be restrained more effectively.

Figure 16A:
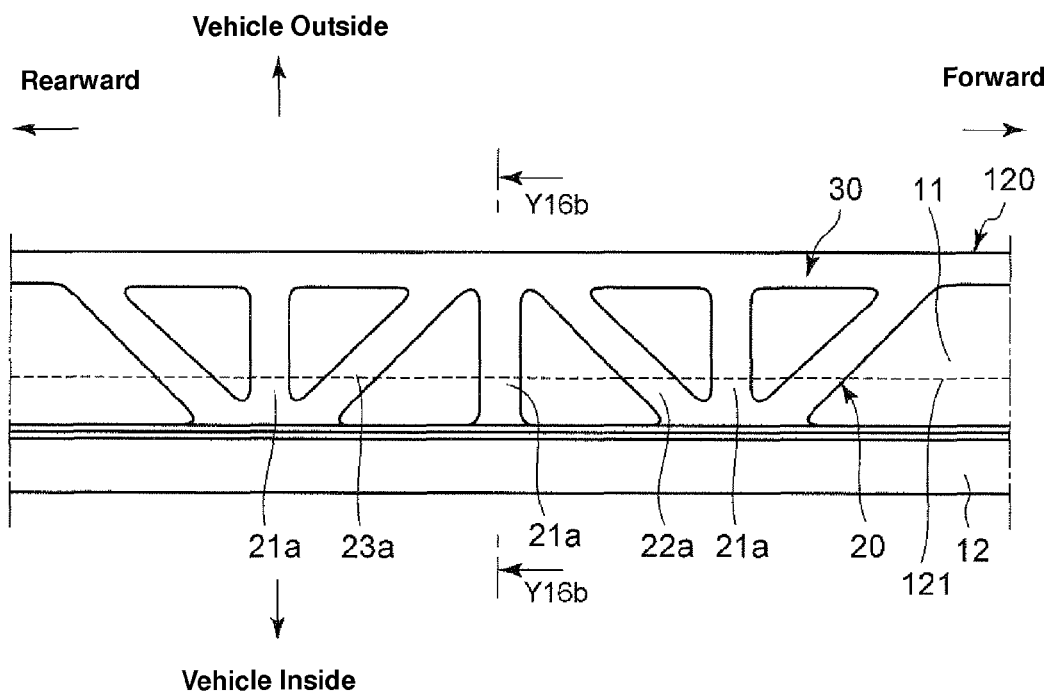
FIGS. 16A and 16B are explanatory diagrams to explain the frame for a vehicle according to a fifth embodiment of the present invention.
Figure 16B:
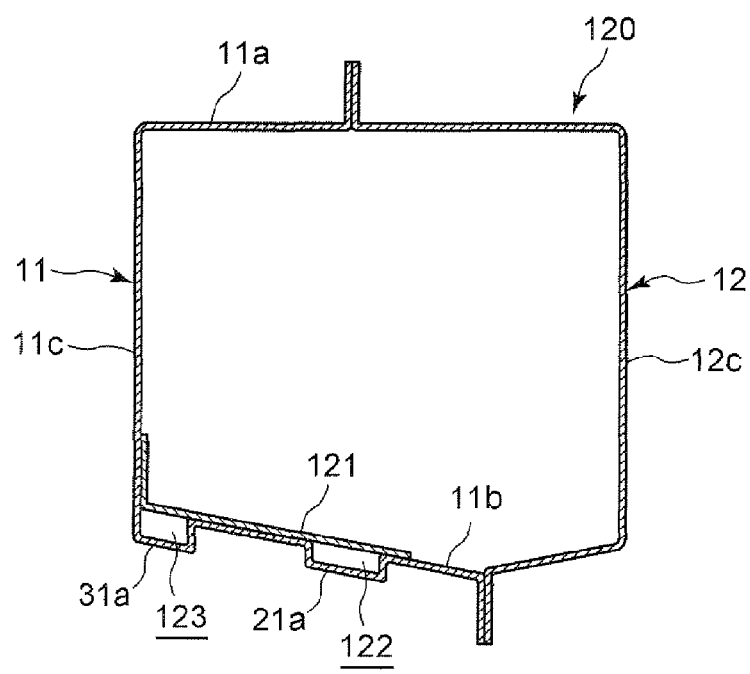

FIGS. 16A and 16B are explanatory diagrams to explain the frame for a vehicle according to a fifth embodiment of the present invention. FIG. 16A is a bottom view of the side sill of the frame for a vehicle according to the fifth embodiment of the present invention, and FIG. 16B is a sectional view taken along line Y16b-Y16b of FIG. 16A. The frame for a vehicle of the fifth embodiment is different from that of the first embodiment only in a plate member attached, so the same components performing the same operation are dented by the same reference characters, descriptions of which are omitted here.

As shown in FIGS. 16A and 16B, according to a side sill 120 of the frame for a vehicle of the fifth embodiment, a plate member 121 is attached to an inside of the lower face portion 11b of the side sill outer 11 of the side sill 120 at the beads 21a, 22a, 23a forming the lateral reinforcement portion 20. This plate member 121 is formed to have a substantially L-shaped cross section and attached over the lower face portion 11b and the side face portion 11c of the side sill outer 11.

A closed cross section 122 is formed by the beads 21a, 22a, 23a and the plate member 121 at the side sill 120. Further, a closed cross section 123 is formed by the bead 30a and the plate member 121. Herein, the plate member 121 is formed to extend from the outside end portion, in the sectional direction of the side sill 120, of the lower face portion 11b of the side sill outer 11 to the central side of the lower face portion 11b, however, it may be formed so as to cover over a whole area, in the sectional direction of the side sill 120, of the lower face portion 11b of the side sill outer 11.

Thus, the plate member 121 is attached to the inside of the third face portion (the lower face portion of the side sill outer) 11b of the frame (side sill) 120 at the beads 21a, 22a, 23a, and the closed cross section 122 is formed by the beads 21a, 22a, 23a and the plate member 121. Thereby, the reinforcement effect of the lateral reinforcement portion 20 can be further increased at the third face portion 11b of the frame 120, so that the bending strength of the frame 120 can be further improved.

Herein, while the side sill 10 of the present embodiment is formed to have the substantially-rectangular closed cross section by the side sill outer 11 comprising the upper face portion 11a, the lower face portion 11b and the side face portion 11c and having the substantially U-shaped cross section and the side sill inner 12 comprising the upper face portion 12a, the lower face portion 12b and the side face portion 12c and having the substantially U-shaped cross section, it may be formed to have the substantially-rectangular closed cross section by the above-described side sill outer 11 and another type of side sill inner comprising the side face portion 12c which is formed to interconnect the upper flange portion 12d and the lower flange portion 12e without the upper face portion 12a and the lower face portion 12b.

The present invention should not be limited to the above-described embodiments, and any other modifications and improvements may be applied within the scope of a spirit of the present invention.

What is claimed is:

1. A frame for a vehicle which is formed to have a closed cross section and constitutes part of a vehicle body, comprising:
   a first face portion on which a compressive force acts when a load acts from an outside;
   a second face portion on which a tensional force acts when the load acts from the outside;
   a pair of third face portions located between the first face portion and the second face portion and forming a ridge-line together with the first face portion;
   a longitudinal bead provided at least at one of the third face portions at a specified position near the ridgeline between the first face portion and the third face portion and extending in a longitudinal direction of the frame in a line shape, the longitudinal bead projecting toward the outside of the frame so as to have a substantially U-shaped cross section; and first and second lateral beads provided at said third face portion where the longitudinal bead is provided and respectively extending in a line shape from the first face portion toward the second face portion, the first lateral bead extending in a sectional direction perpendicular to the longitudinal direction of the frame, the second lateral bead being located adjacent to the first lateral bead and extending in a slant direction relative to the longitudinal direction of the frame, the first and second lateral beads projecting toward the outside of the frame so as to have a substantially U-shaped cross section, respectively, wherein said first and second lateral beads connect to said longitudinal bead on the side of said first face portion and the first and second lateral beads connect to each other on the side of said second face portion, whereby a substantially triangular area is formed at the third face portion by the longitudinal bead, the first lateral bead and the second lateral bead which extend continuously surrounding the area.

2. The frame for a vehicle of claim 1, further comprising a third lateral bead which is located adjacent to said first lateral bead on an opposite side to said second lateral bead and extending in another slant direction relative to the longitudinal direction of the frame, wherein said first and third lateral beads connect to said longitudinal bead on the side of said first face portion and the first and third lateral beads connect to each other on the side of said second face portion, whereby another substantially triangular area is formed at the third face portion by the longitudinal bead, the first lateral bead and the third lateral bead which extend continuously surrounding the area.

3. The frame for a vehicle of claim 2, wherein said two substantially triangular areas are located in order along the longitudinal direction of the frame.

4. The frame for a vehicle of claim 1, wherein said first and second lateral beads are respectively configured such that a width thereof becomes wider toward said second face portion from the first face portion.

5. The frame for a vehicle of claim 1, wherein said frame is a side sill which is formed to have the closed cross section and comprises a side sill outer which comprises an upper face portion extending horizontally, a lower face portion located below the upper face portion and extending horizontally, and a side face portion extending vertically from the lower face portion to the upper face portion and forming ridgelines together with the upper face portion and the lower face portion, and a side sill inner which is provided on an inside of the side face portion of the side sill outer and comprises a side face portion extending vertically, and said longitudinal bead, first and second lateral beads are provided at said lower face portion of the side sill outer.

6. The frame for a vehicle of claim 1, wherein a central part of said substantially triangular area protrudes toward the outside of the frame.

7. The frame for a vehicle of claim 1, wherein said first and second lateral beads are configured such that a bead projection amount becomes greater along a direction from said first face portion to said second face portion.

8. The frame for a vehicle of claim 1, wherein said first and second lateral beads are configured in a curve shape to project toward the outside of the frame from an end side, in the cross direction of the frame, of said third face portion toward a central side, in the cross direction of the frame, of the third face portion.

9. The frame for a vehicle of claim 1, wherein a plate member is attached to an inside of said frame at said first and second beads, and a closed cross section is formed by said plate member and the beads.

10. The frame for a vehicle of claim 1, wherein said longitudinal bead is configured to have a substantially-constant bead projection amount over the longitudinal direction of the frame, and said first and second lateral beads are configured to have substantially the same bead projection amount as that of the longitudinal bead.

11. The frame for a vehicle of claim 1, wherein said longitudinal bead is provided just at the ridgeline between the first face portion and the third face portion such that one side face of the substantially U-shaped cross section of the longitudinal bead is continuous from said first face portion of the frame.

* * * * *